(12) United States Patent
Maeta

(10) Patent No.: US 10,880,477 B2
(45) Date of Patent: Dec. 29, 2020

(54) IMAGE CAPTURING APPARATUS AND MULTI-READOUT MODE CONTROL METHOD FOR CARRYING OUT A LIVE VIEW DISPLAY

(71) Applicant: CANON KABUSHIKI KAISHA, Tokyo (JP)

(72) Inventor: Shinichi Maeta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/391,742

(22) Filed: Apr. 23, 2019

(65) Prior Publication Data

US 2019/0335102 A1 Oct. 31, 2019

(30) Foreign Application Priority Data

Apr. 26, 2018 (JP) .................................. 2018-085723

(51) Int. Cl.
*H04N 5/232* (2006.01)

(52) U.S. Cl.
CPC ..... *H04N 5/23245* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 9,648,222 B2* | 5/2017 | Washizu | ............ | G02B 13/0015 |
| 10,511,779 B1* | 12/2019 | Haruna | .............. | H04N 5/23293 |
| 2009/0213237 A1* | 8/2009 | Ishida | ................ | H04N 5/23245 |
| | | | | 348/221.1 |
| 2010/0194922 A1* | 8/2010 | Honda | ............... | H04N 5/23248 |
| | | | | 348/231.99 |
| 2010/0194958 A1* | 8/2010 | Honda | ................... | H04N 5/343 |
| | | | | 348/311 |
| 2012/0057038 A1* | 3/2012 | Suzuki | ............... | H04N 5/23245 |
| | | | | 348/220.1 |
| 2014/0293090 A1* | 10/2014 | Yonemoto | .......... | H04N 5/23245 |
| | | | | 348/231.6 |
| 2014/0375861 A1* | 12/2014 | Jang | ................... | H04N 5/23293 |
| | | | | 348/333.01 |
| 2016/0353043 A1* | 12/2016 | Kishi | ..................... | H04N 5/378 |
| 2017/0134673 A1* | 5/2017 | Uchida | ..................... | G02B 7/34 |
| 2017/0359500 A1* | 12/2017 | Inagaki | .................. | G02B 7/282 |
| 2019/0037157 A1* | 1/2019 | Matsumura | .......... | H04N 5/3532 |
| 2019/0281206 A1* | 9/2019 | Lee | ...................... | H04N 7/0127 |

FOREIGN PATENT DOCUMENTS

| | | |
|---|---|---|
| JP | 2012-010074 A | 1/2012 |
| JP | 2014-122957 A | 7/2014 |

\* cited by examiner

*Primary Examiner* — Cynthia Segura
(74) *Attorney, Agent, or Firm* — Cowan, Liebowitz & Latman, P.C.

(57) ABSTRACT

An image capturing apparatus comprises an image sensor including a plurality of pixels and at least one processor or circuit configured to function as: a readout unit that, to carry out a live view display, reads out pixel signals from the image sensor in a first readout mode, and to obtain a still image during the live view display, reads out pixel signals from the image sensor in a second readout mode that is different from the first readout mode; and a control unit that controls the readout unit so that a readout time in the first readout mode is equal to a readout time in the second readout mode.

11 Claims, 20 Drawing Sheets

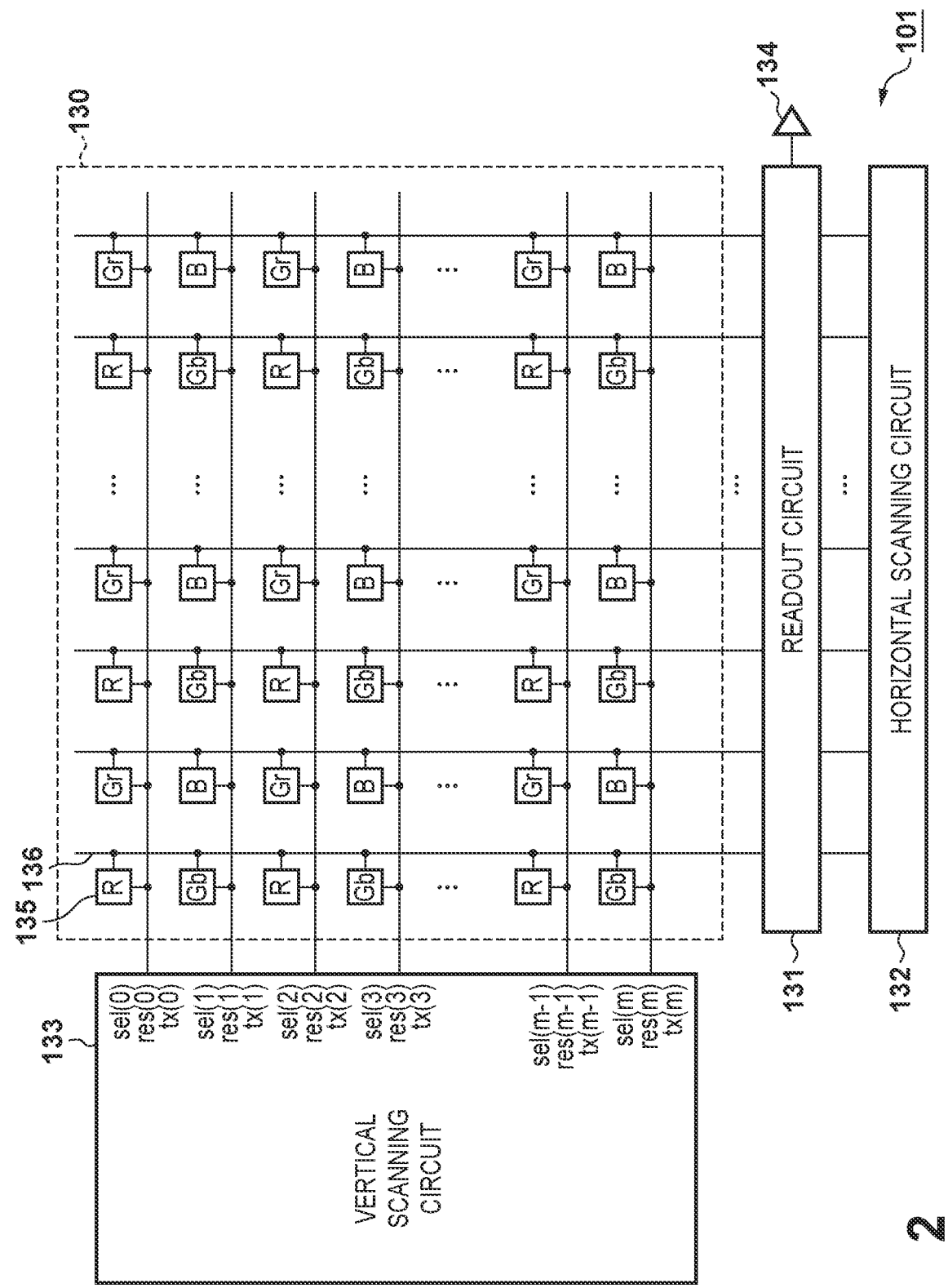
F I G. 2

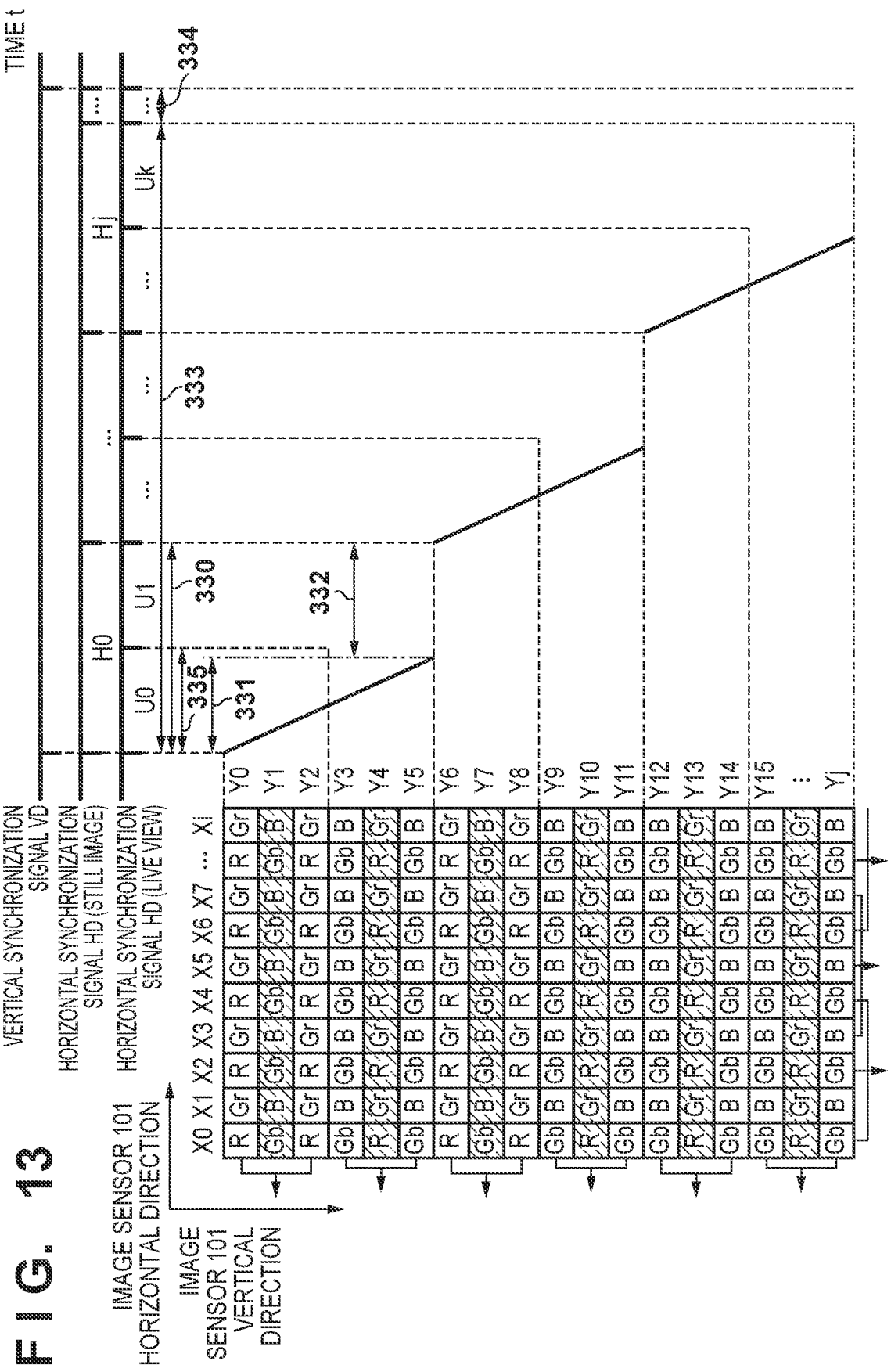
F I G. 13

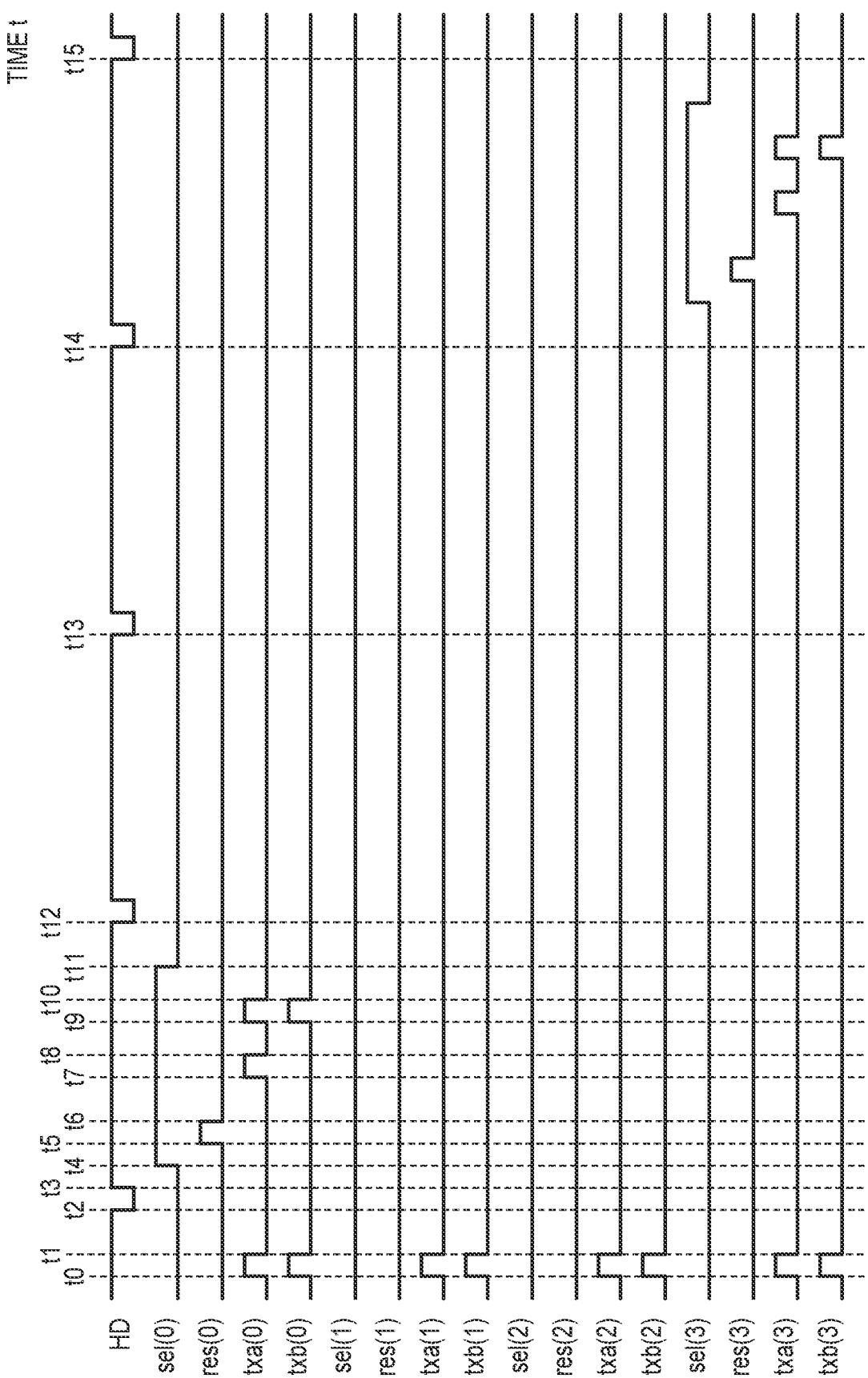

IMAGE CAPTURING APPARATUS AND MULTI-READOUT MODE CONTROL METHOD FOR CARRYING OUT A LIVE VIEW DISPLAY

BACKGROUND OF THE INVENTION

Field of the Invention

The present invention relates to image capturing apparatuses and control methods thereof.

Description of the Related Art

Image capturing apparatuses traditionally include what is known as a "live view" function, in which a moving image is displayed in a display unit of the image capturing apparatus, for example, for the purpose of confirming a subject to be shot. In particular, recent years have seen techniques in which the display of the live view (image display) is updated during a series of shooting operations for obtaining a still image in order to eliminate states where the same image is continually displayed in the live view display, a blackout occurs and no image is displayed, and the like.

Japanese Patent Laid-Open No. 2014-122957 discloses a technique in which two image sensors are provided, with one image sensor shooting a still image at the same time as the other image sensor carries out live view shooting so that the still image is generated and output along with the live view.

Japanese Patent Laid-Open No. 2012-10074 discloses a technique in which a reset operation and a readout operation for a still image are divided by a single image sensor during a live view display, so that the still image is generated and output along with the live view.

However, the past technique disclosed in the above-described Japanese Patent Laid-Open No. 2014-122957 has a problem in that two image sensors are required, which increases the size of the camera body. There is a further problem in that the camera will consume more power than a camera having only a single image sensor.

Additionally, although the past technique disclosed in the above-described Japanese Patent Laid-Open No. 2012-10074 does use only a single image sensor, the reset operation and the readout operation for the still image are divided between readout frames used for live view display, and thus it is conceivable that there will be increased release time lag. Furthermore, it is assumed that exposure control is carried out using what is known as a "global shutter", in which the exposure start times are made uniform for all pixels and the exposure end times are made uniform for all pixels in a still image signal. As such, a still image cannot be shot without blackout by an image sensor that does not have the global shutter function.

SUMMARY OF THE INVENTION

Having been achieved in light of the above-described problems, the present invention provides an image capturing apparatus that enables a still image to be shot without interrupting a live view display.

According to a first aspect of the present invention, there is provided an image capturing apparatus comprising: an image sensor including a plurality of pixels; and at least one processor or circuit configured to function as: a readout unit that, to carry out a live view display, reads out pixel signals from the image sensor in a first readout mode, and to obtain a still image during the live view display, reads out pixel signals from the image sensor in a second readout mode that is different from the first readout mode; and a control unit that controls the readout unit so that a readout time in the first readout mode is equal to a readout time in the second readout mode.

According to a second aspect of the present invention, there is provided a method for controlling an image capturing apparatus, the image capturing apparatus including an image sensor having a plurality of pixels, and the method comprising: reading out pixel signals, to carry out a live view display, from the image sensor in a first readout mode, and reading out pixel signals, to obtain a still image during the live view display, from the image sensor in a second readout mode that is different from the first readout mode; and controlling the readout so that a readout time in the first readout mode is equal to a readout time in the second readout mode.

Further features of the present invention will become apparent from the following description of exemplary embodiments with reference to the attached drawings.

BRIEF DESCRIPTION OF THE DRAWINGS

FIG. 2 is a diagram illustrating the configuration of an image sensor according to the first embodiment.

FIG. 13 is a diagram illustrating live view image readout operations by the image sensor according to the third embodiment.

FIG. 20 is a diagram illustrating operation timings of the image sensor according to the fourth embodiment.

DESCRIPTION OF THE EMBODIMENTS

Hereinafter, embodiments of the present invention will be described in detail with reference to the appended drawings.

First Embodiment

Figure 1:
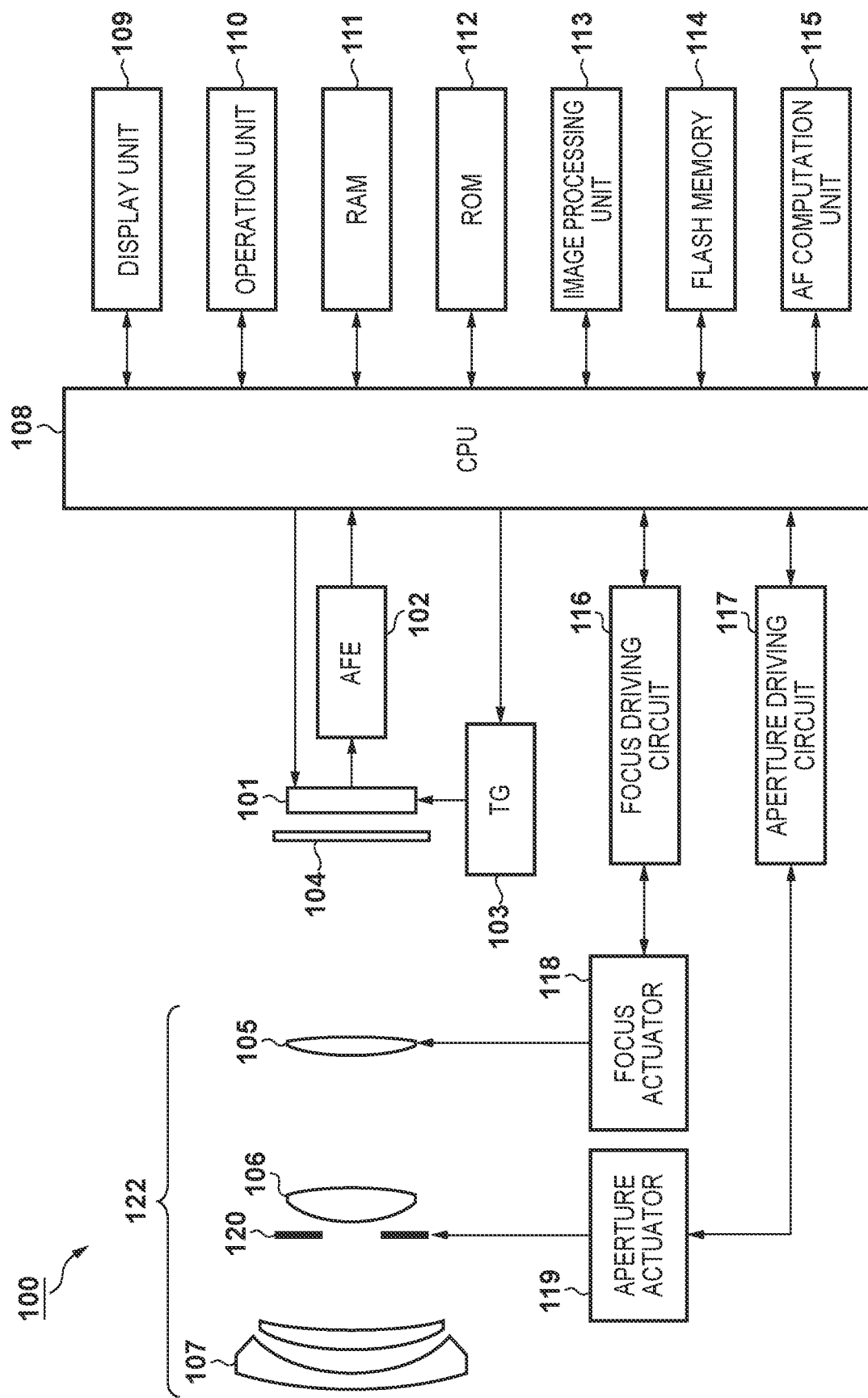
FIG. 1 is a block diagram illustrating the configuration of an image capturing apparatus according to a first embodiment of the present invention.

FIG. 1 is a diagram illustrating the configuration of an image capturing apparatus 100 according to a first embodiment of the present invention. The image capturing apparatus 100 includes an optical imaging system (an image forming optical system) 122 and an image sensor 101.

In the optical imaging system 122, a first lens group 107 is arranged on a forward end side of the optical imaging system 122 (a subject side), and is supported so as to be capable of extending and retracting in an optical axis direction using a lens barrel. An aperture 120 adjusts the amount of light during shooting by adjusting the diameter of an opening. A second lens group 106 extends and retracts in the optical axis direction along with the aperture 120. The second lens group 106 has a function for magnifying (zooming) in tandem with the extending/retracting operation of the first lens group 107. A third lens group 105 is a focus lens group that adjusts the focus by extending and retracting in the optical axis direction.

A focal plane shutter 104 adjusts the exposure time when shooting a still image. In the present embodiment, the configuration is such that the exposure time of the image sensor 101 is adjusted by the focal plane shutter 104. However, the configuration is not limited thereto, and may be such that the image sensor 101 has an electronic shutter function, and the exposure time is adjusted using control pulses.

The image sensor 101, which converts an optical image into an electrical signal, captures both still images and moving images. The image sensor 101 according to the present embodiment is an image sensor that can change the resolution of an image to be read out.

When a low-resolution image is obtained, the image sensor 101 is driven through pixel thinning driving, which reads out the signals of only some of the pixels, or pixel mixing driving, which reads out the signals of a plurality of pixels in a mixed state.

On the other hand, when a high resolution image is obtained, the image sensor 101 is driven through full pixel readout driving, in which the signals of all the pixels are read out. When obtaining a low-resolution image, only a small amount of time is required to read out the signals, which makes it possible to read out the signal of the next image at an earlier timing, or in other words, to increase the framerate.

An AFE (analog front end) 102 adjusts the gain of an analog image signal output by the image sensor 101, converts the analog image signal to a digital signal corresponding to a predetermined quantization bit, and so on. A TG (timing generator) 103 controls the driving timing of the image sensor 101 and the AFE 102.

The image data output by the AFE 102 is sent to a CPU (central processing unit) 108. In response to control signals from the CPU 108, the TG 103 generates drive signals and outputs the drive signals to the image sensor 101. Although the AFE 102 and the TG 103, which are provided outside the image sensor 101, are used in the present embodiment, the configuration may be such that the AFE and the TG are built into the image sensor.

The CPU 108 controls the image capturing apparatus as a whole. The CPU 108 controls a focus driving circuit 116 and an aperture driving circuit 117. For example, the CPU 108 controls the driving of a focus actuator 118 using the focus driving circuit 116, on the basis of a focus detection result (detection information) from an AF (autofocus) computation unit 115. As a result, a focus adjustment operation is carried out by the third lens group 105 extending and retracting in the optical axis direction. Additionally, the CPU 108 controls the driving of an aperture actuator 119 using the aperture driving circuit 117, and controls the diameter of the opening in the aperture 120.

In addition to the AF computation unit 115, a display unit 109, an operation unit 110, RAM 111, ROM 112, an image processing unit 113, and flash memory 114 are connected to the CPU 108. The operation unit 110 includes a shutter switch button and a moving image shooting switch button, and is used when making shooting instructions executed by a user, operations for setting shooting conditions or the like, and so on to the CPU 108.

The display unit 109 displays still images, moving images (live view images), and so on that have been shot, menus, and the like. The display unit 109 includes a thin-film transistor (TFT) liquid crystal display, a viewfinder, and the like provided in a rear surface of the camera body. The RAM (random access memory) 111 stores image data converted into digital data by the AFE 102, data processed by the image processing unit 113, and the like. The RAM 111 also functions as an image data storage unit for storing image data processed by the image processing unit 113, as well as work memory for the CPU 108.

Although the RAM 111 having these functions is employed in the present embodiment, other memory may be used as long as it is memory having a sufficient access speed. The ROM (read only memory) 112 stores programs that are interpreted and executed by the CPU 108, and employs a memory device such as flash ROM.

The image processing unit 113 mainly carries out processing for subjecting images captured by the image sensor 101 to correction, compression, and the like. The flash memory 114 is a removable memory device for recording still image data and moving image data. Although flash memory is used as the recording medium in the present embodiment, non-volatile memory, a hard disk, or the like, into which data can be written, may be used instead. The recording medium may also be built into the case.

FIG. 2 is a diagram illustrating the circuit configuration of the image sensor 101. The image sensor 101 includes a pixel array 130, a vertical scanning circuit 133 that selects rows in the pixel array 130, and a horizontal scanning circuit 132 that selects columns in the pixel array 130. The image sensor 101 further includes a readout circuit 131 that reads out the signals of pixels, among the pixels in the pixel array 130, that have been selected by the vertical scanning circuit 133 and the horizontal scanning circuit 132. A plurality of pixels 135 are arranged in a matrix in the pixel array 130. The R, Gr and Gb, and B within the pixels 135 indicate pixels in which red, green, and blue color filters are arranged, respectively.

The vertical scanning circuit 133 selects a row of the pixel array 130, and on the basis of a horizontal synchronization signal output from the CPU 108, activates a readout pulse output from the TG 103 in the selected row. The readout circuit 131 includes an amplifier, memory, and the like for each column, and the pixel signals of the selected row are stored in the memory via the amplifier. One row's worth of pixel signals stored in the memory are selected by the horizontal scanning circuit 132 in sequence in the column direction, and are output to the exterior via column output lines 136 and an output amplifier 134. These operations are repeated the same number of times as there are rows, and all of the pixel signals are output to the exterior.

Figure 3:
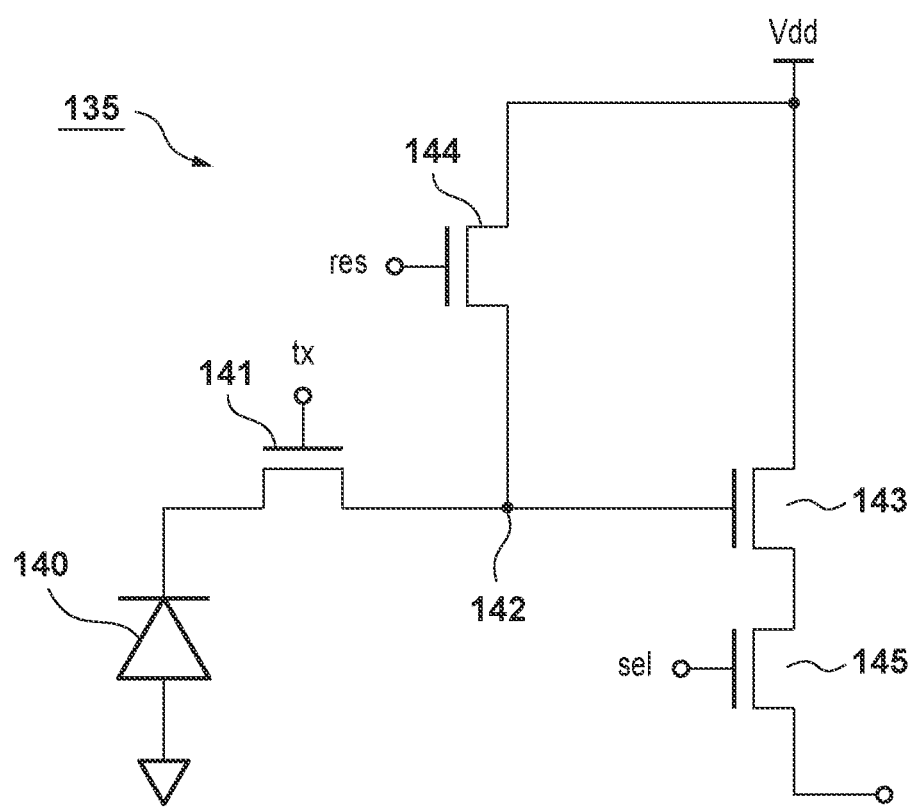
FIG. 3 is a diagram illustrating the configuration of a pixel in the image sensor according to the first embodiment.

The configuration of a single one of the pixels 135 will be described here using FIG. 3. A photodiode (PD) 140 photoelectrically converts incident light and accumulates a charge based on the exposure amount. A transfer gate 141 turns on (enters a conductive state) in response to a transfer control signal tx going to high level, and the charge accumulated in the PD 140 is transferred to a floating diffusion unit (FD unit) 142. The FD unit 142 is connected to the gate of an amplifying MOS transistor 143. The amplifying MOS transistor 143 outputs a voltage signal based on the charge amount transferred from the PD 140 to the FD unit 142.

A reset switch 144 is a switch for resetting the charge in the FD unit 142, the PD 140, and the like. The reset switch 144 turns on (enters a conductive state) in response to a reset control signal res going to high level, and the charge in the FD unit 142 is reset.

Additionally, when the charge in the PD 140 is reset, the transfer control signal tx and the reset control signal res go to high level simultaneously. Both the transfer gate 141 and the reset switch 144 turn on, and the charge in the PD 140 is reset via the FD unit 142.

A pixel selection switch 145 turns on (enters a conductive state) in response to a selection control signal sel going to high level, and connects the amplifying MOS transistor 143 to the output terminal of the pixel 135. As a result, the pixel signal, which has been transformed to a voltage by the amplifying MOS transistor 143, is output from the output terminal of the pixel 135.

Although the present embodiment describes an example of a configuration in which each pixel includes a single PD, the configuration may be such that two or more (e.g., two, four, or the like) PDs are provided in a single pixel. In other words, the present invention can also be applied in a configuration in which a plurality of PDs are arranged in the vertical direction or the horizontal direction in a single pixel.

Next, operations of the image capturing apparatus carried out when shooting a still image during live view display according to the present embodiment will be described using FIGS. 4 and 5.

Figure 4:
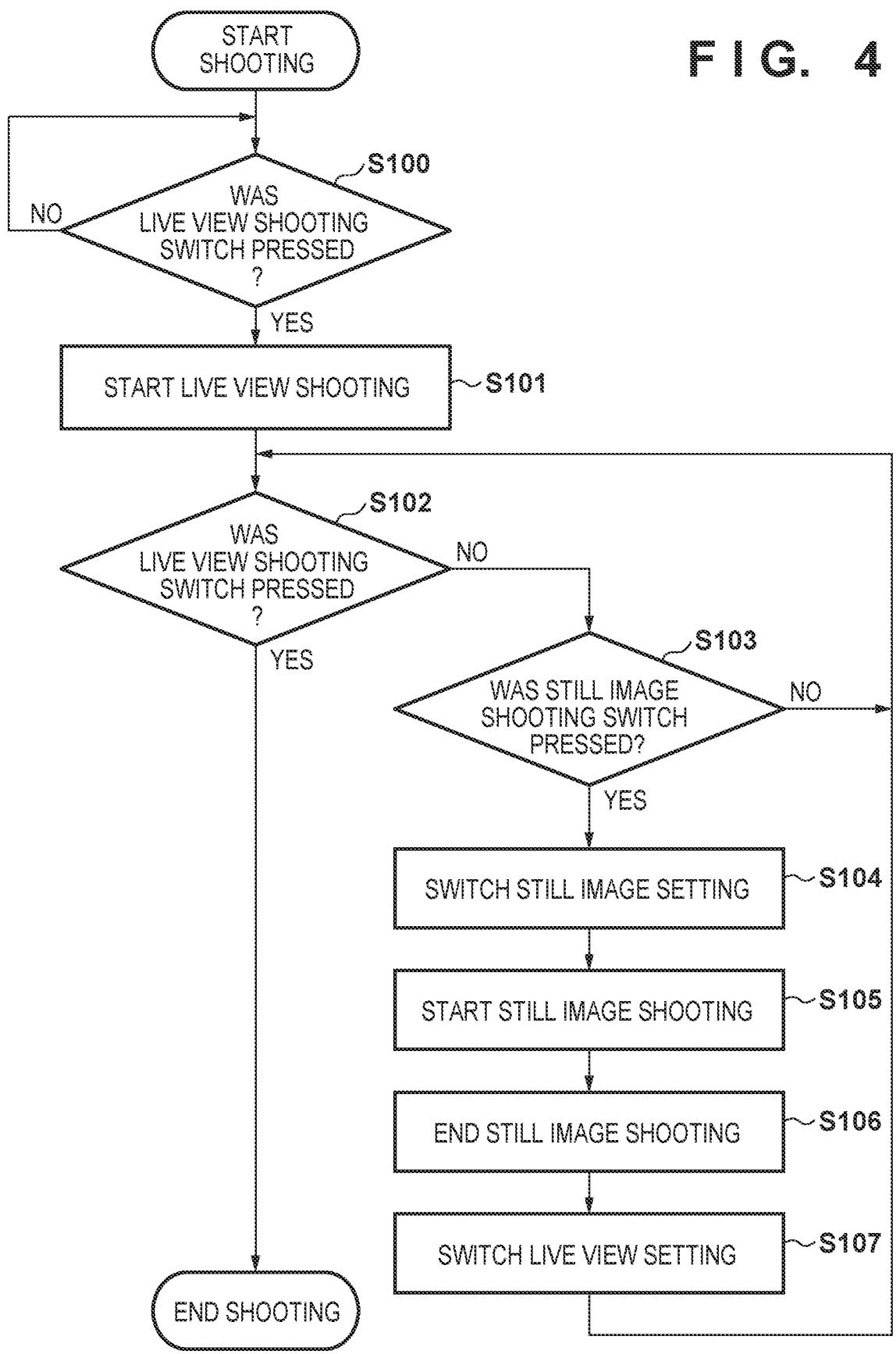
FIG. 4 is a flowchart illustrating image capturing operations according to the first embodiment.

FIG. 4 is a flowchart illustrating operations of the image capturing apparatus carried out when shooting a still image during live view display according to the present embodiment. FIG. 5 is a diagram illustrating the timings of readouts when shooting a still image during live view display. Note that in FIG. 5, the vertical axis represents each position of the image sensor in the vertical direction, and the horizontal axis represents time. Display image frame n expresses the nth frame, and n to n+7 display image frames are indicated as an example. The length of an accumulation time 202 for the image sensor 101 according to the time illustrated in FIG. 5 is determined by the still image shooting settings.

First, in S100, the image sensor 101 remains in a standby state until a live view shooting switch button, included in the operation unit 110, is pressed. When the live view shooting switch button is pressed by a user, the CPU 108 starts live view shooting operations in S101.

Power is supplied to the image sensor 101, the AFE 102, and the TG 103, and the CPU 108 makes live view shooting settings. After the settings, the TG 103 outputs a readout pulse to the image sensor on the basis of a synchronization signal output from the CPU 108, and the image sensor 101 starts image signal readout operations at a prescribed framerate.

Figure 5:
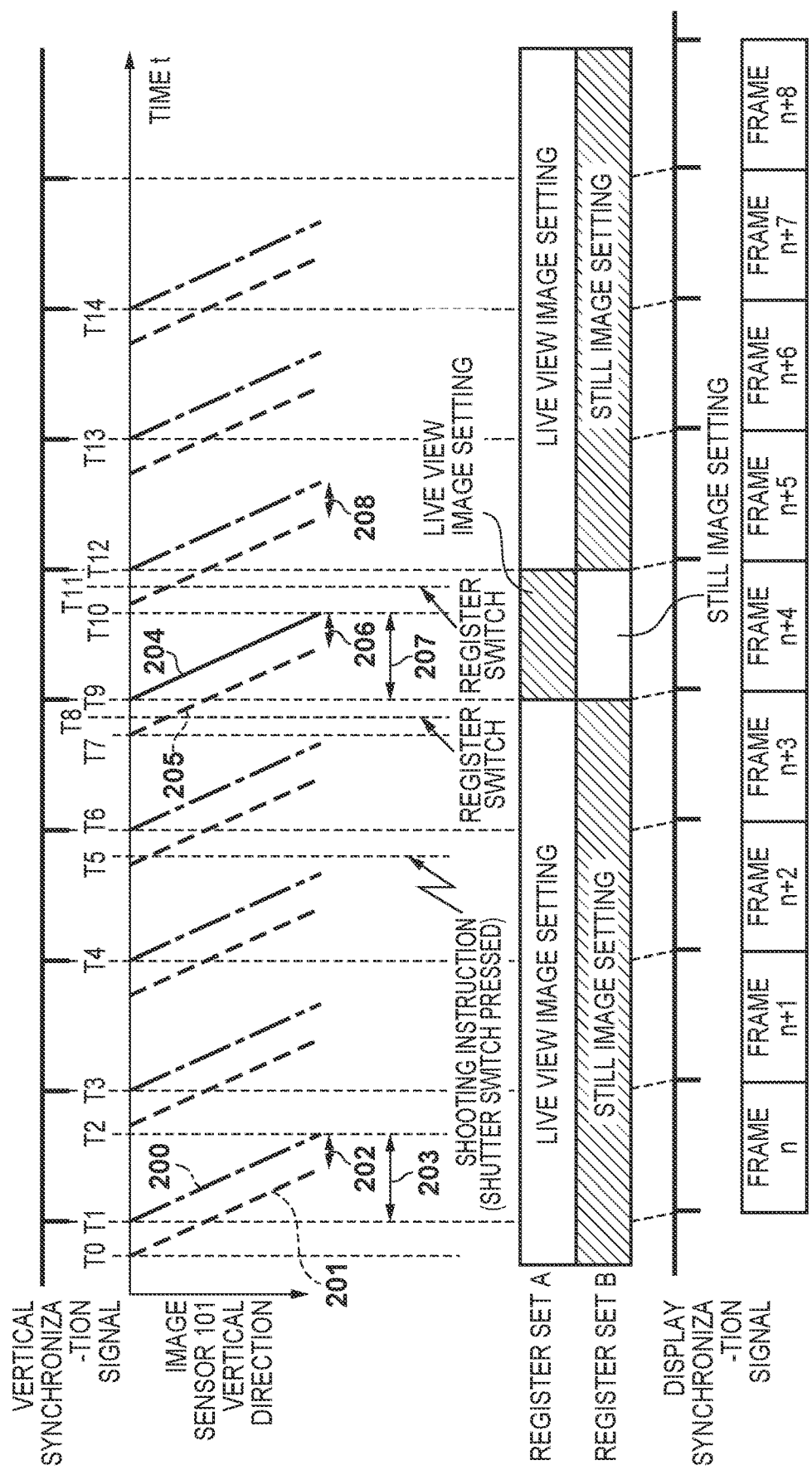
FIG. 5 is a sequence chart illustrating image capturing operations according to the first embodiment.

Reset scanning, in which each pixel row of the image sensor 101 is reset in sequence, is carried out from time T0 in FIG. 5 as indicated by the diagonal line segment 201, and the PD 140 in each pixel 135 starts accumulating a signal.

At time T1, readout scanning, indicated by the diagonal line segment 200, is started from the pixel row of the image sensor 101 for which the reset scanning is complete. The signals accumulated during the accumulation time 202 are read out during time 203, which spans from time T1 to time T2.

Although the signal accumulation for live view images and still images, as well as the readout operations, are carried out using an electronic shutter function employing slit-rolling operations in the present embodiment, the configuration is not limited to slit-rolling operations.

The image signal output from the image sensor 101 is transferred to the RAM 111 by the CPU 108. Then, the image signal is transferred to the image processing unit 113, where processes such as correction and compression are carried out, and live view frame data is created. An image is displayed in the display unit 109 in accordance with the created moving image frame data (live view display).

The image signal read out from the image sensor 101 during time 203, which spans from time T1 to time T2, is used in the n+1th frame (display image frame n+1).

Rather than reading out the signals of all the pixels in the image sensor 101 for displaying an image in the display unit 109, the image sensor 101 reads out only some of the pixel signals, or mixes the signals of the plurality of pixels to read out an image signal having a resolution sufficient for use in the display. At this time, control is carried out so that the readout time 203 for the image signals used for live image display is the same as a readout time 207 for image signals used for a still image, which will be described later.

The image signals read out from the image sensor 101 at the timings from time T3, T4, and T6 are used in an n+2th frame (display image frame n+2), an n+3th frame (display image frame n+3), and an n+4th frame (display image frame n+4), respectively.

In S102, the CPU 108 determines whether or not the live view shooting switch button has been operated again. If the live view shooting switch button has not been operated, the live view shooting operations continue. However, if the live view shooting switch button has been operated in S102, the live view shooting operations and the live view display are terminated.

If in S102 the live view shooting switch button has not been operated, the process moves to S103, where it is determined whether or not the shutter switch button (still image shooting switch button) included in the operation unit 110 has been pressed.

If the shutter switch button has not been operated, the process returns to S102, and the live view shooting operations continue. However, if the shutter switch button is pressed by the user, the CPU 108 switches the image sensor 101 from a live view shooting mode to a still image shooting mode in S104.

Figure 6:
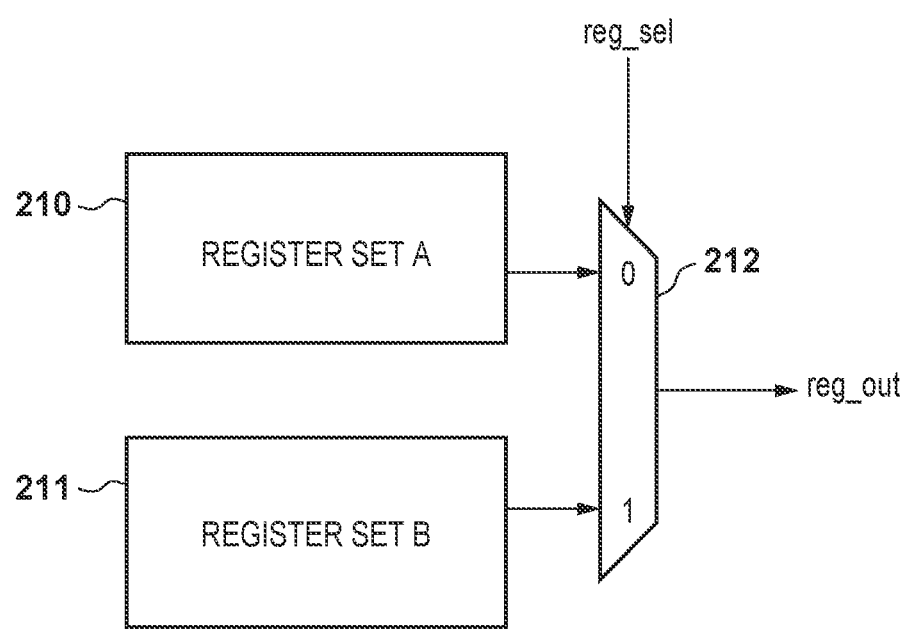
FIG. 6 is a diagram illustrating a configuration for switching image capturing operations according to the first embodiment.

At this time, live view shooting settings and still image shooting settings are held as indicated in FIG. 6. Specifically, a live view shooting setting value group is held in a register set A210 provided in the image sensor 101, and a still image shooting setting value group is held in a register set B211 provided in the image sensor 101.

At time T8, which comes after the live view image signal readout started at time T6 is completed following a shooting instruction made at time T5, the setting value group output to a selector 212 is switched by a register control signal reg_sel output from the TG 103.

In other words, a switch is made from the live view shooting setting value group held in the register set A210 to the still image shooting setting value group held in the register set B211.

The configuration is such that the setting value groups held in the register set A210 and the register set B211 are switched in synchronization with a vertical synchronization signal, and the post-switch setting values are reflected at time T9.

In this manner, the live view shooting setting value group held in the register set A210 is valid until time T9, whereas the still image shooting setting value group held in the register set B211 is valid from time T9. FIG. 5 indicates the one of the register sets A and B that is invalid with hatching.

In S105, operations for acquiring a still image are started, and at time T7, still image reset scanning 205 is started. As a result, the charges in the pixels of the image sensor 101 are cleared in sequence on a pixel row-by-pixel row basis.

The still image reset scanning 205 is carried out in the same manner as the live view reset scanning indicated by the diagonal line segment 201. Note, however, that the still image reset scanning is not limited thereto, and the charges in all pixel rows may be cleared simultaneously.

Although a still image accumulation time 206 of the image sensor 101 is determined by the still image shooting settings, it is desirable that the accumulation time 206 match the live view shooting accumulation time 202 in order to maintain the continuity and consistency of the displayed image.

At time T9, readout scanning, indicated by the diagonal line segment 204, is started from the pixel row of the image sensor 101 for which the still image reset scanning is complete. The signals accumulated during the accumulation time 206 are read out during time 207, which spans from time T9 to time T10.

The readout scanning time 207 for the still image data, which spans from time T9 to time T10, matches the readout scanning time 203 for the live view image data. This is because the readout scanning time for the live view image data is adjusted, in advance, to match the readout scanning time for the still image data, through a method that will be described later.

The image signal for the still image read out from the image sensor 101 during time 207, which spans from time T9 to time T10, is used in the n+5th frame (display image frame n+5), and is recorded into the flash memory 114.

At this time, the readout scanning time 203 for the live view image data is adjusted so as to match the readout scanning time 207 for the still image data.

As such, the n+4th frame (display image frame n+4) generated from the live view image data and the n+5th frame (display image frame n+5) generated from the still image data are displayed without a blackout frame interrupting the display, and without freezing, in which the same image continues to be displayed.

Once the operations for obtaining a still image in S106 end, the CPU 108 switches the image sensor 101 from the still image shooting mode to the live view shooting mode in S107.

At time T11, which comes after the still image signal readout started at time T9 is completed, the setting value group output to the selector 212 is switched by the register control signal reg_sel output from the TG 103.

In other words, a switch is made from the still image shooting setting value group held in the register set B211 to the live view shooting setting value group held in the register set A210.

The configuration is such that the setting value groups held in the register set A210 and the register set B211 are switched in synchronization with the vertical synchronization signal, and the post-switch setting values are reflected at time T12.

In this manner, the still image shooting setting value group held in the register set B211 is valid until time T12, whereas the live view shooting setting value group held in the register set A210 is valid from time T12.

The switch of the setting value group is not yet reflected at time T10, and thus the live view image reset scanning is started with the still image settings. Then, at time T12, the live view image readout scanning is started with the live view shooting settings, from the pixel row in the image sensor 101 for which the reset scanning is complete.

The image signals read out from the image sensor 101 at the timings from time T12, T13, and T14 are used in an n+6th frame (display image frame n+6), an n+7th frame (display image frame n+7), and an n+8th frame (display image frame n+8), respectively.

Note that a live view image accumulation time 208 of the image sensor 101 need not match the accumulation time 202 of the nth frame, nor the accumulation time 206 of the n+5th frame.

Figure 7:
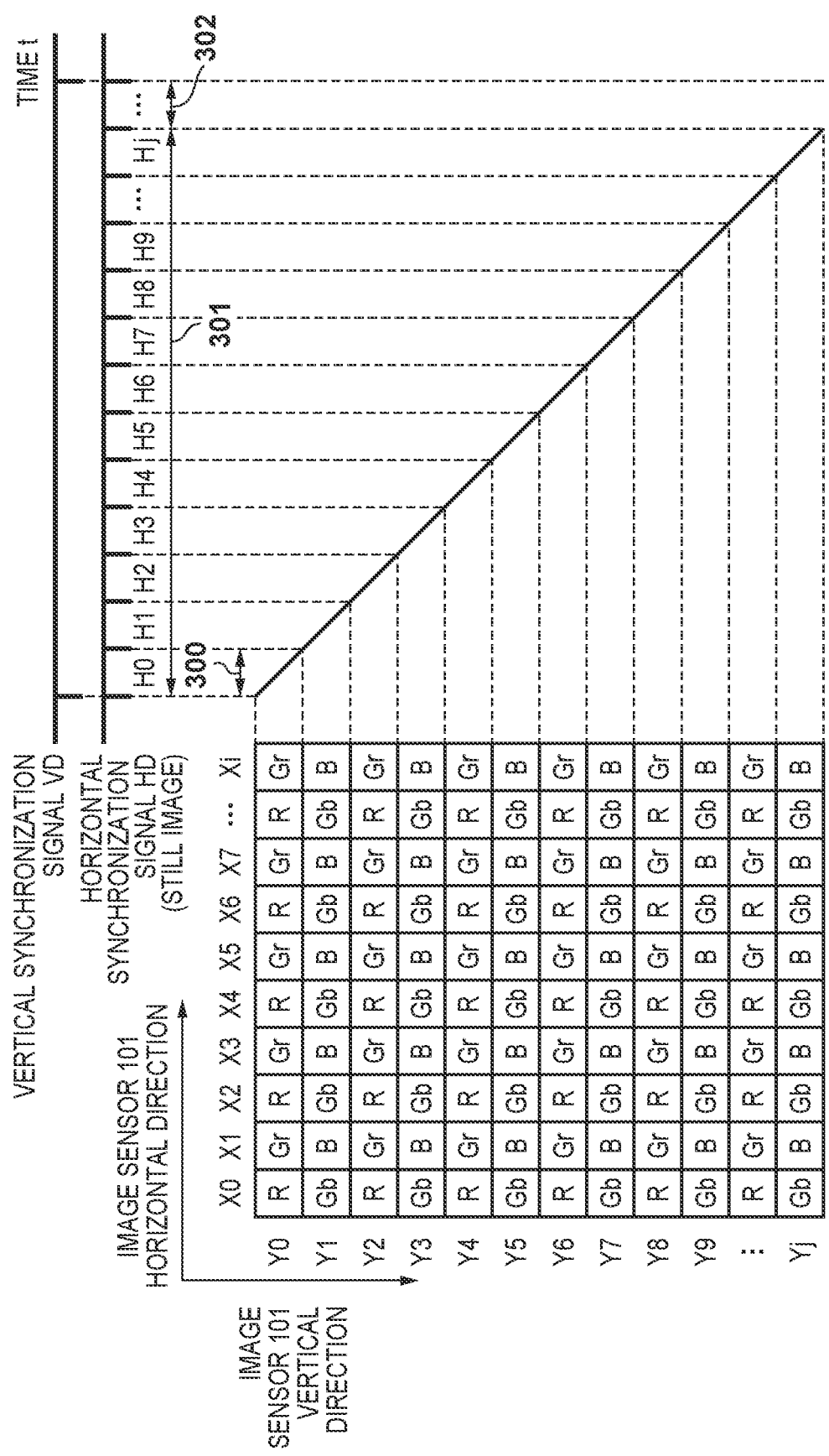
FIG. 7 is a diagram illustrating still image readout operations by the image sensor according to the first embodiment.
Figure 8:
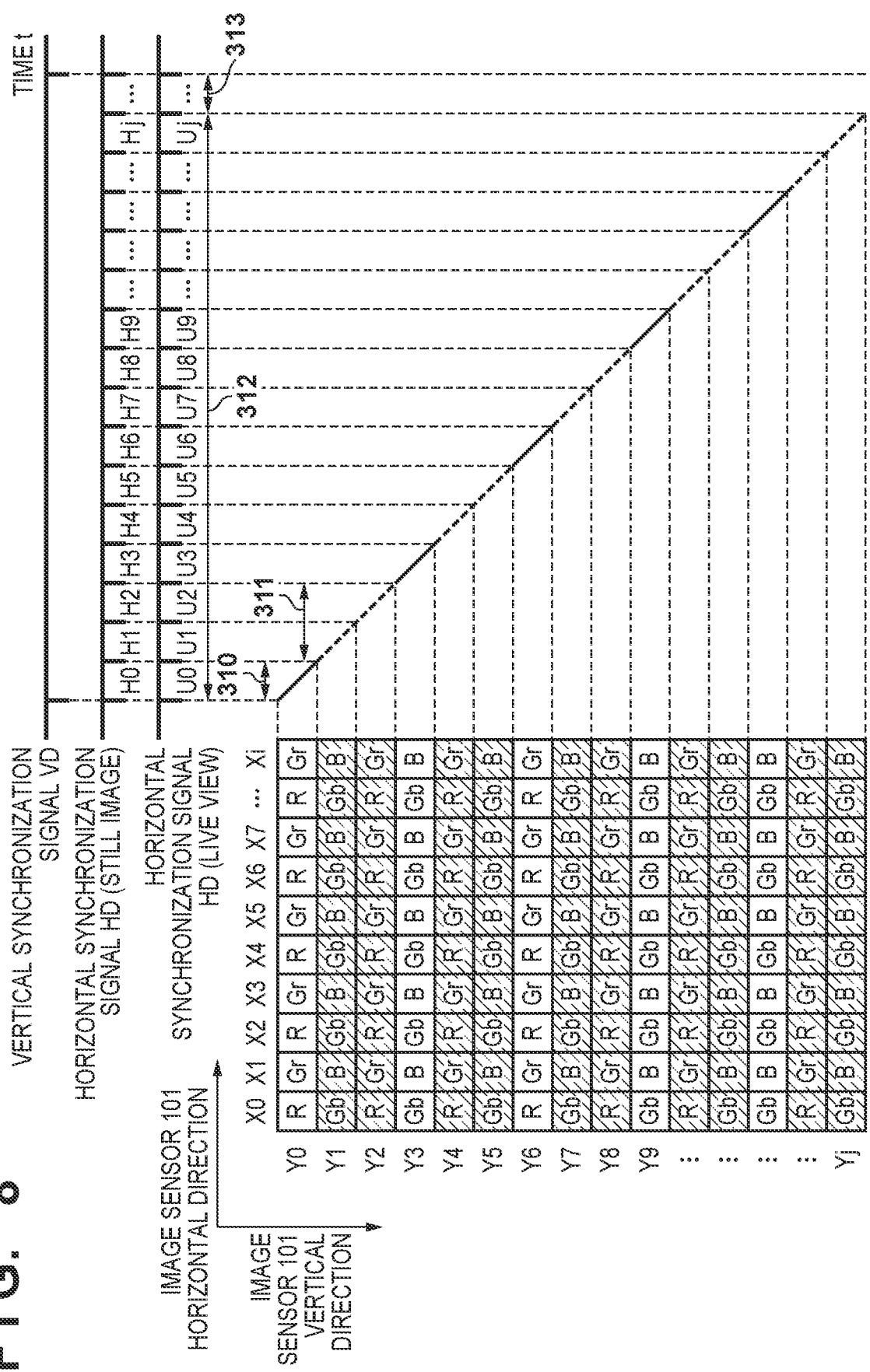
FIG. 8 is a diagram illustrating live view image readout operations by the image sensor according to the first embodiment.

Operations for causing the readout scanning time 203 for the live view image and the readout scanning time 207 for still images to match according to the present embodiment will be described next using FIGS. 7, 8, 9, and 10. FIG. 7 is a diagram illustrating still image readout scanning according to the present embodiment. FIG. 8 is a diagram illustrating live view image readout scanning according to the present embodiment.

The image sensor 101 is a Bayer array CMOS sensor. In readout performed when shooting a still image, signals are read out in a horizontal period H0 of a horizontal synchronization signal HD, without the signals of horizontal direction pixels X0 to Xi, located at a vertical direction position Y0 indicated in FIG. 7, being mixed. In a horizontal readout time 300, which corresponds to the horizontal period H0, the signals of the horizontal direction pixels X0 to Xi, located at the vertical direction position Y0, are read out. The signals of the pixels in vertical direction positions Y1, Y2, and so on up to Y1 are also read out in the same horizontal readout time.

This is carried out for all rows in the vertical direction up to a vertical direction position Yj, and the readout of one frame's worth of signals is complete at the point in time when a horizontal synchronization period Hj ends. In other words, one frame of a still image is read out during time 301. Time 302 is a blanking time (vertical blanking time) spanning from when the readout of the current frame is completed to when the readout scanning starts for the next frame.

On the other hand, in readout during live view shooting, the number of pixels that are read out is reduced by reading out the pixel signals in a mixed or thinned state. Here, it is assumed that thinned readout is carried out, with the first of every three rows in the vertical direction being read out, as indicated in FIG. 8. The hatched pixels indicate pixels for which the signals are not read out due to the thinning or the like.

As when shooting a still image, signals are read out from the horizontal direction pixels X0 to Xi, located at the vertical direction position Y0, in a horizontal period U0 of the horizontal synchronization signal HD. A horizontal readout time 310, which corresponds to the horizontal period U0, matches the still image horizontal readout time 300 indicated in FIG. 7.

However, unlike when shooting a still image, the signals of the pixels located at a vertical direction position Y1 are not read out in a horizontal period U1. Likewise, the signals of the pixels located at a vertical direction position Y2 are not read out in a horizontal period U2. In other words, a time when the pixel signal readout is stopped is purposefully provided.

Signals are once again read out from the horizontal direction pixels X0 to Xi, located at the vertical direction position Y3, in a horizontal period U3 of the horizontal synchronization signal HD. This is carried out for all rows in the vertical direction up to the vertical direction position Yj, whereupon the signal readout time for live view shooting is complete.

At this time, in the readout method used during live view shooting, the image sensor 101 does not carry out readout scanning during a time 311, which corresponds to the horizontal period U1 and the horizontal period U2. Accordingly, the power consumed by a current source, circuitry such as an op-amp, and the like included in the readout circuit 131 can be reduced.

Figure 9:
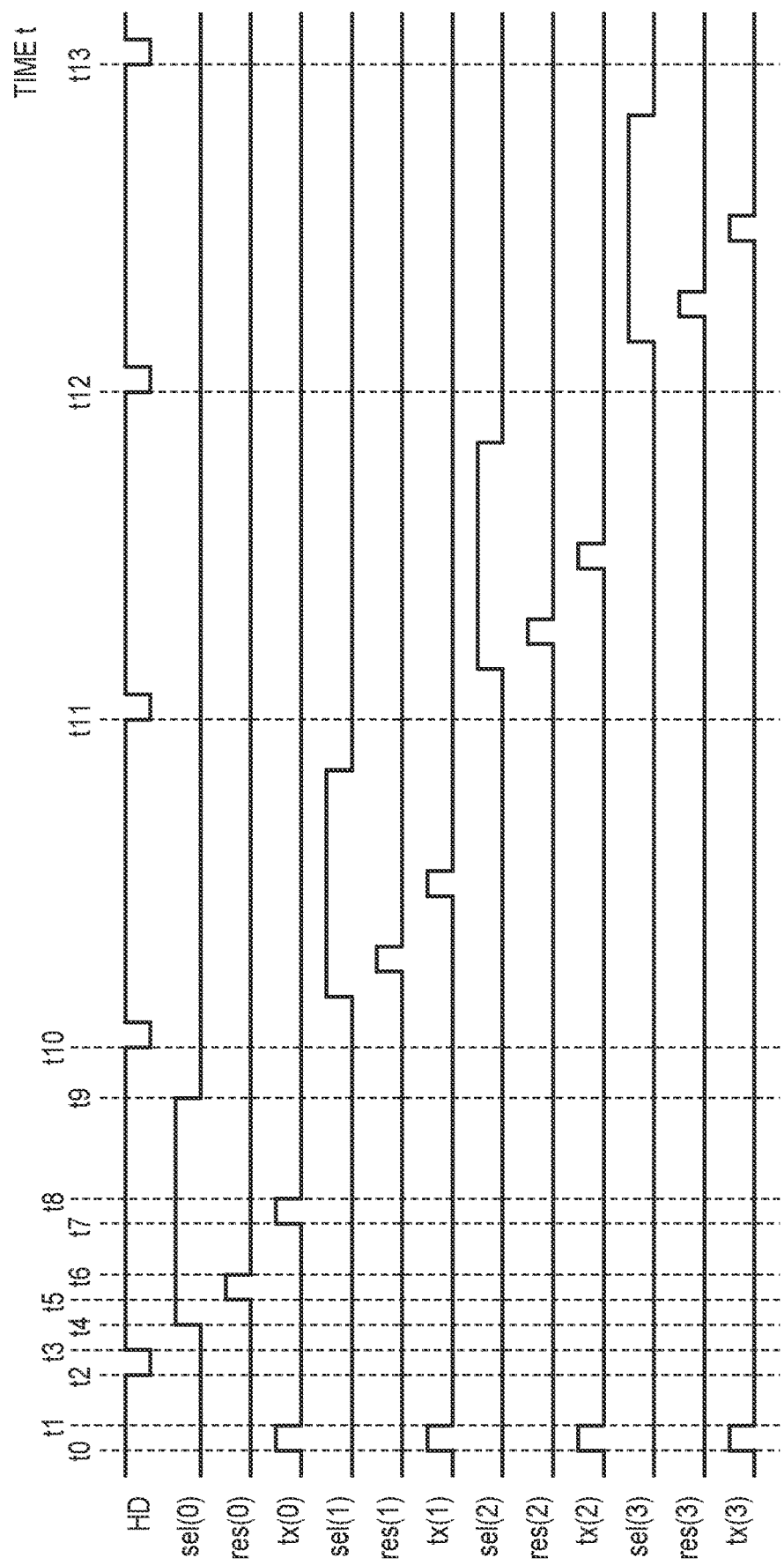
FIG. 9 is a diagram illustrating operation timings when the image sensor captures a still image, according to the first embodiment.

FIG. 9 is a diagram illustrating operation timings of the image sensor 101 during still image shooting according to the present embodiment. The image sensor 101 is controlled by the TG 103, under the control of the CPU 108.

As indicated in FIG. 9, from time t0 to time t1 (a total pixel reset time), the vertical scanning circuit 133 illustrated in FIG. 2 activates transfer control signals tx(0) to tx(3). As a result, in all of the pixels, the charges accumulated in the photodiodes 140, illustrated in FIG. 3, are transferred to the FD units 142 via the transfer gates 141, and the charges in the photodiodes 140 of all the pixels are reset.

Note that at the same time, the vertical scanning circuit 133 may activate reset control signals res(0) to res(3) and turn the reset switch 144 on.

At time t1, the vertical scanning circuit 133 negates the transfer control signals tx(0) to tx(3). As a result, the resetting of the photodiodes 140 is cancelled, and charge accumulation is started simultaneously, for all of the pixels. At a given timing within the time from time t1 to time t2, light incident on the image sensor 101 is blocked by a mechanism outside the image sensor 101 (e.g., the focal plane shutter 104).

Signal charges are accumulated in the photodiodes 140 of all the pixels in a time spanning from time t1 to when the incident light is blocked (an accumulation time). Although the accumulation of the signal charges is started simultaneously for all of the pixels in the present embodiment, the configuration is not limited thereto. Additionally, the timings at which the photodiodes 140 are reset may differ from row to row.

At time t2, the horizontal synchronization signal HD, which indicates the readout time for a single row, is asserted by the CPU 108. Then, at time t4, the vertical transfer (column transfer) is started for the signals of the pixels in the Y0th row indicated in FIG. 7. In other words, at time t4, the vertical scanning circuit 133 activates the selection control signal sel(0) and turns the pixel selection switch 145 on.

At time t5, the vertical scanning circuit 133 activates the reset control signal res(0). As a result, the reset switch 144 is turned on, and the charge of a capacitance defined by the FD unit 142 is reset.

At time t6, the vertical scanning circuit 133 negates the reset control signal res(0). As a result, the reset switch 144 is turned off, the reset is cancelled, and the charge amount in the FD unit 142 at that time is transformed to a voltage by the amplifying MOS transistor 143. A signal having a signal level corresponding to when the reset is cancelled (what is known as a "dark level") is output to the column output lines 136.

Then, at time t7, the vertical scanning circuit 133 activates the transfer control signal tx(0) and turns the transfer gate 141 on. The signal charges accumulated in the photodiodes 140 of the pixels are transferred to the FD units 142, transformed into voltages by the amplifying MOS transistors 143, and output. At this time, the potential varies from the reset level by an amount that counterbalances the transferred signal charge, and the signal level is set.

At time t8, the vertical scanning circuit 133 negates the transfer control signal tx(0), and at time t9, which is after the vertical transfer of signals from the pixels 135 has ended, the vertical scanning circuit 133 negates the selection control signal sel(0). After the pixel signal output has ended, the readout of the pixels in the next row is started at time t10. The time from time t2 to time t10 is equal to the time 300 indicated in FIG. 7.

From time t10 to time t11, the selection control signal sel(1), the reset control signal res(1), and the transfer control signal tx(1) are supplied in sequence, at the same timings as during the readout of the pixel signals from the pixels 135 in the Y0th row, carried out from time t2 to time t10. The pixel signals from the pixels 135 in the Y1th row are output as a result.

In the same manner, the pixel signals are read out from the pixels in the Y2th and Y3th rows, from time t11 to time t12, and from time t12 to time t13, respectively. Thus in still image shooting, the pixel signals are output from all the pixels in the image sensor 101 by carrying out the readout operations for all rows in the image sensor 101.

Figure 10:
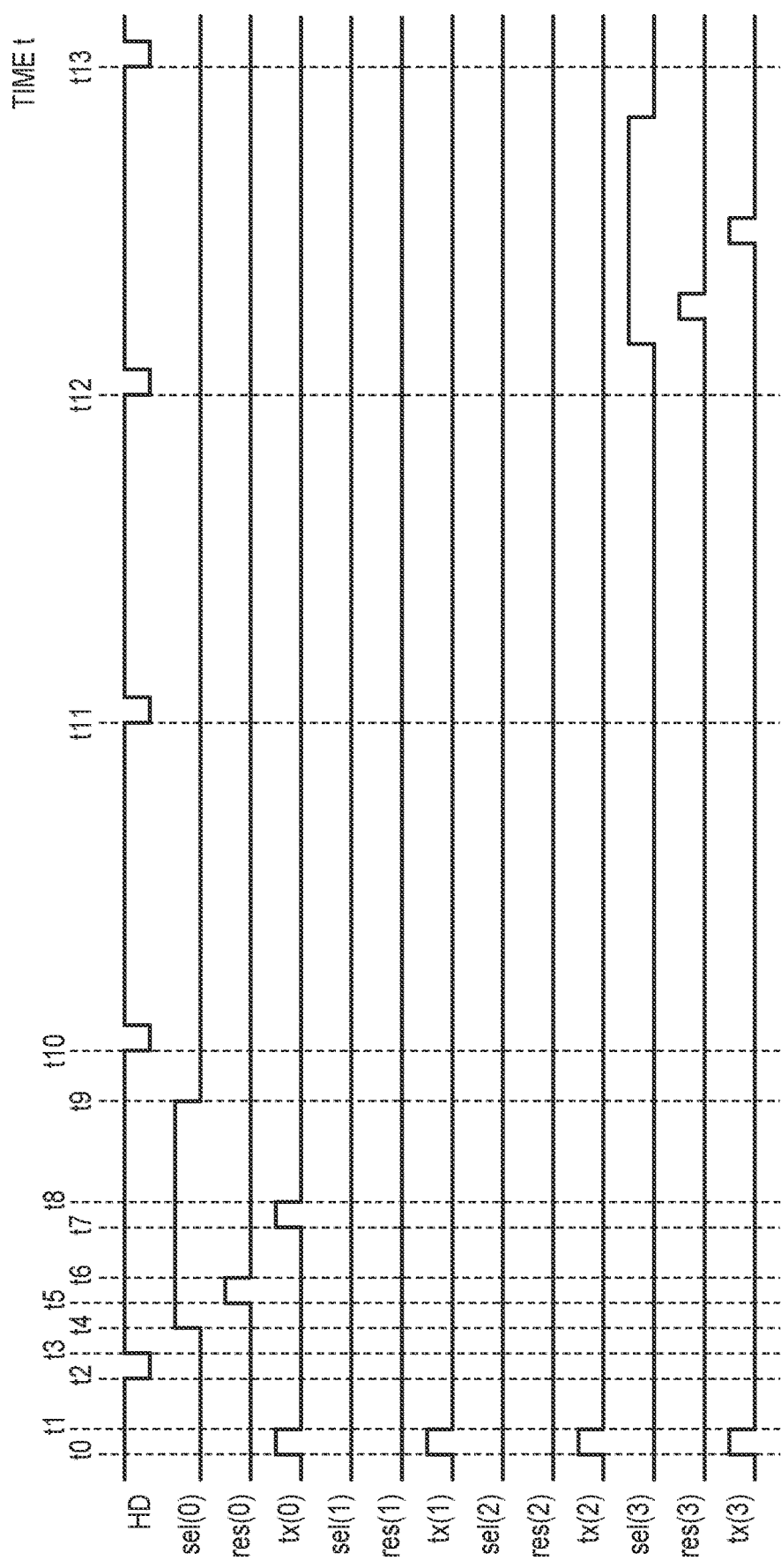
FIG. 10 is a diagram illustrating operation timings when the image sensor captures a live view image, according to the first embodiment.

FIG. 10 is a diagram illustrating operation timings of the image sensor 101 during live view shooting according to the present embodiment.

As illustrated in FIG. 10, the selection control signal sel(0), the reset control signal res(0), and the transfer control signal tx(0) are supplied in sequence, at the same timings as when reading out the pixel signals from the pixels 135 in the Y0th row from time t0 to time t10 as indicated in FIG. 9, and the pixel signals are output from the pixels 135 in the Y0th row.

However, the pixel signals are not read out from the pixels in the Y1th row and the Y2th row, from time t10 to time t11, and from time t11 to time t12, respectively. As such, the selection control signals sel(1) and sel(2), the reset control signals res(1) and res(2), and the transfer control signals tx(1) and tx(2) are not controlled. The time from time t2 to time t10 is equal to the time 310 indicated in FIG. 8, and the time from time t10 to time t12 is equal to the time 311 indicated in FIG. 8.

Next, from time t12 to time t13, the selection control signal sel(3), the reset control signal res(3), and the transfer control signal tx(3) are supplied in sequence, at the same timings as during the readout of the pixel signals from the pixels 135 in the Y3th row, carried out from time t12 to time t13 in the same manner as indicated in FIG. 9, and the pixel signals are output from the pixels 135 in the Y3th row. Thus in live view shooting, the pixel signals are output from only part of the image sensor 101.

As a result of these operations, a readout time 312 corresponding to one frame in the live view image, indicated in FIG. 8, matches the time 301 indicated in FIG. 7. Likewise, the time 301 indicated in FIG. 7 matches the time 207 indicated in FIG. 5, and the time 312 indicated in FIG. 8 matches the time 203 indicated in FIG. 5. In other words, the readout time for one frame of a still image matches the readout time for one frame of a live view image.

As a result of the above-described operations, signals are read out from a matching number of readout pixels in a single horizontal period of the horizontal synchronization signal, during both still image shooting and live view shooting, and the TG 103 is controlled for each readout mode. Carrying out control in this manner ensures that the still image readout time and the live view image readout time are equal.

This eliminates restrictions on the still image readout scanning and reset scanning, and the live view image readout scanning and reset scanning, which in turn makes it possible to display still image readout and live view image readout without any blackouts.

Although the present embodiment describes a method in which signals are read out by thinning out two of every three rows of pixels in the vertical direction during live view shooting, the thinning number is not limited thereto, and the configuration may be such that the readout is carried out using any desired thinning number.

As described thus far, according to the present embodiment, a still image can be shot at the same time even during live view shooting, without reducing the framerate and while continuing the live view display.

Second Embodiment

The first embodiment describes a situation where the horizontal readout time is equal in the readout method used during still image shooting and the readout method used during live view shooting. However, a second embodiment will describe a situation where the horizontal readout time is different between the readout method used during still image shooting and the readout method used during live view shooting, with reference to FIG. 11.

Figure 11:
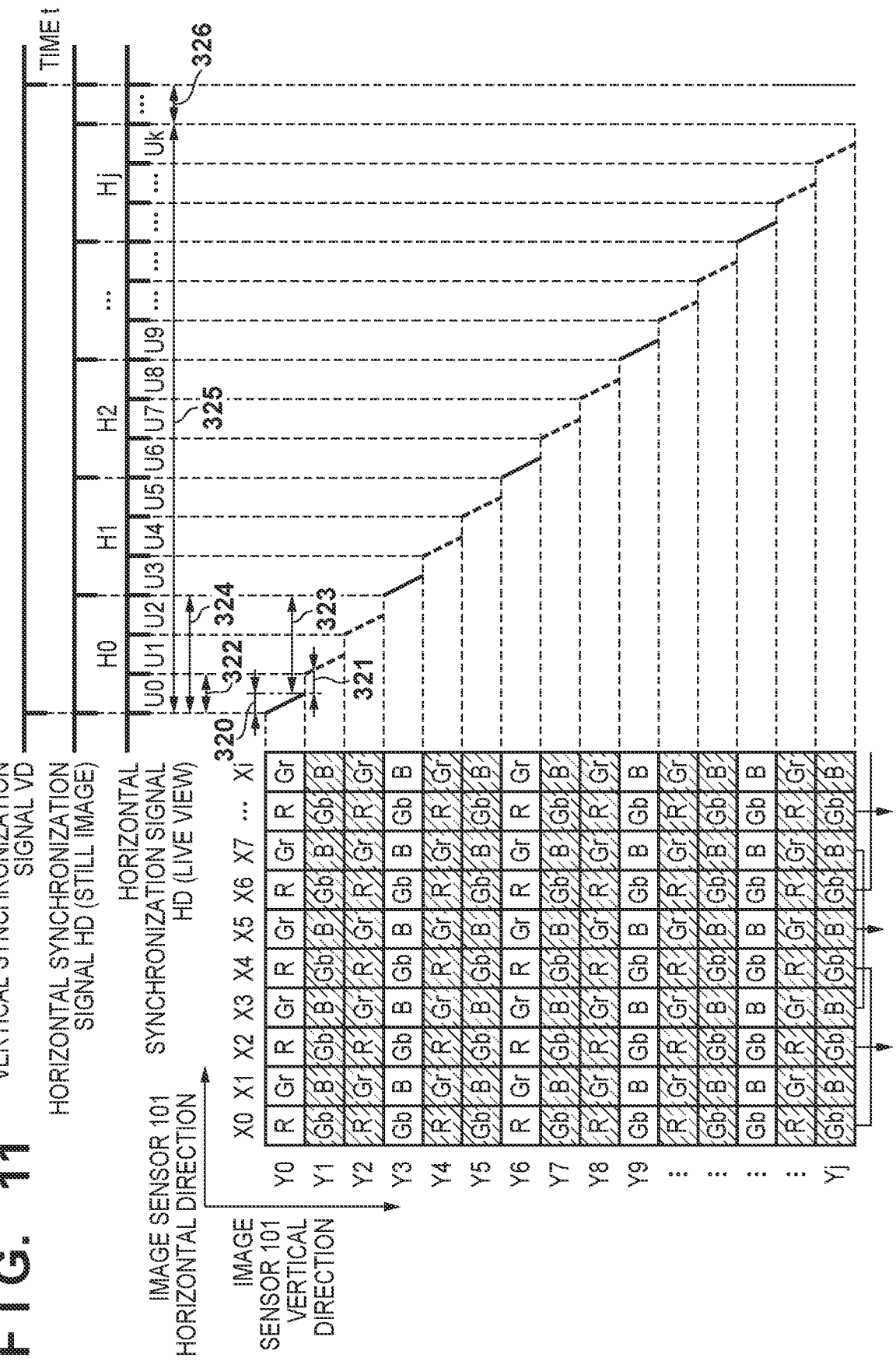
FIG. 11 is a diagram illustrating live view image readout operations by the image sensor according to a second embodiment.

FIG. 11 is a diagram illustrating live view image readout scanning according to the present embodiment. Here, the readout method used during still image shooting is the same as in the first embodiment and will therefore not be described.

In the readout method used during live view shooting, the signals from every three pixels are mixed with respect to the horizontal direction, and thinned readout is carried out with the first of every three rows being read out with respect to the vertical direction. As in the first embodiment, the hatched pixels are pixels that are not read out.

Signals are read out from the horizontal direction pixels X0 to Xi, located at the vertical direction position Y0, in the horizontal period U0 of the horizontal synchronization signal HD. At this time, a horizontal readout time 320 is shorter than a time 322 corresponding to the horizontal period U0 of the horizontal synchronization signal. Accordingly, a horizontal blanking period 321, in which the readout circuitry does not operate, is provided.

Next, the pixel signals are not read out from the pixels at the vertical direction position Y1 in the horizontal period U1 of the horizontal synchronization signal. Likewise, the pixel signals are not read out from the pixels at the vertical direction position Y2 in the horizontal period U2 of the horizontal synchronization signal.

Signals are once again read out from the horizontal direction pixels X0 to Xi, located at the vertical direction position Y3, in the horizontal period U3 of the horizontal synchronization signal. At this time, the time 300 corresponding to the horizontal period H0 of the horizontal synchronization signal for still images, indicated in FIG. 7, matches a time 324 corresponding to the total of the horizontal periods U0, U1, and U2 of the horizontal synchronization signal for live view, indicated in FIG. 11.

This is carried out for all pixels in the vertical direction up to the vertical direction position Yj, whereupon the signal readout time for live view shooting is complete. A horizontal readout time 324 for the live view image matches the time 300 indicated in FIG. 7, in the same manner as in the first embodiment.

Likewise, a readout time 325 corresponding to one frame in the live view image, indicated in FIG. 11, matches the readout time 203 corresponding to one frame of a still image, indicated in FIG. 5. Note that time 326 is a vertical blanking interval spanning from when the signal readout for the current frame is completed to when the readout scanning starts for the next frame.

At this time, in the readout method used during live view shooting, the image sensor 101 does not carry out readout scanning during a time 323, which corresponds to the horizontal period U1 of the horizontal synchronization signal and the horizontal period U2 of the horizontal synchronization signal. Accordingly, the power of a current source, circuitry such as an op-amp, and the like included in the readout circuit 131 can be reduced, providing an effect of suppressing the amount of power consumed.

The timings of operations by the image sensor 101 during still image shooting and live view shooting are the same as those described in the first embodiment with reference to FIGS. 9 and 10. The time from time t2 to time t10 indicated in FIG. 9 is equal to the time 324 indicated in FIG. 11, and the time from time t2 to time t10 indicated in FIG. 10 is equal to the time 322 indicated in FIG. 11.

According to the above-described operations, even if the horizontal period of the horizontal synchronization signal is not the same between still image shooting and live view shooting, the readout is carried out such that the horizontal readout time during still image shooting is equal to the sum of the horizontal readout time during live view shooting and the horizontal blanking interval. This ensures that the still image readout time and the live view image readout time are equal.

This also eliminates restrictions on the still image readout scanning and reset scanning, and the live view image readout scanning and reset scanning, which in turn makes it possible to display still image readout and live view image readout without any blackouts.

Although the present embodiment describes a method in which the signals from every three pixels are mixed with respect to the horizontal direction and read out during live view shooting, the number of pixels for which the signals are mixed is not limited thereto, and the configuration may be such that the readout is carried out having mixed the signals from every desired given number of pixels.

Third Embodiment

The first and second embodiments describe a situation where a single column output line is used in the readout method used during still image shooting and the readout method used during live view shooting, as indicated in FIG. 2. However, a third embodiment will describe a situation where a plurality of column output lines are used in the readout method used during still image shooting and the readout method used during live view shooting, with reference to FIGS. 12 and 13.

Figure 12:
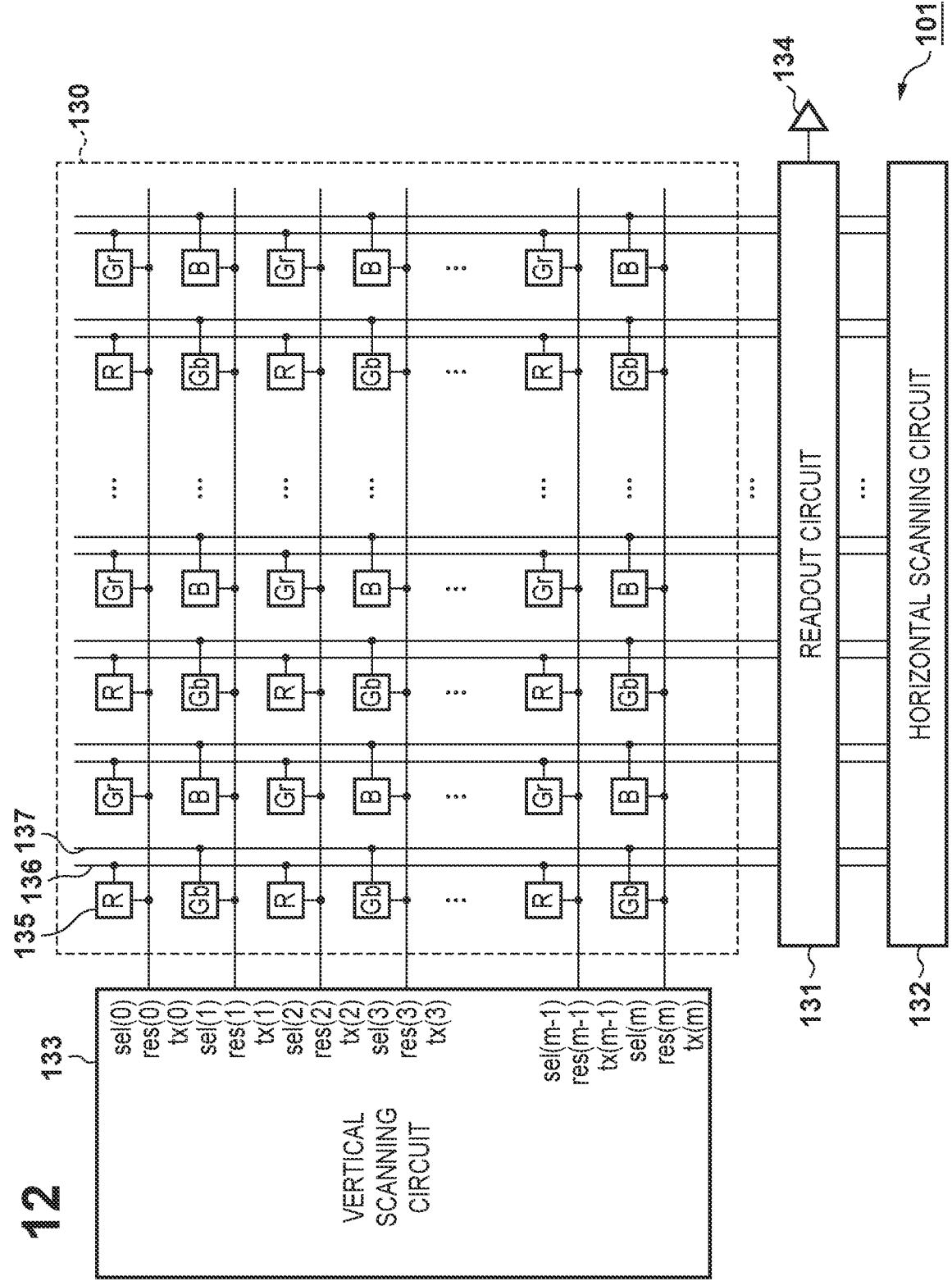
FIG. 12 is a diagram illustrating the configuration of an image sensor according to a third embodiment.

FIG. 12 is a diagram illustrating an example of the circuit configuration of the image sensor 101. Parts that are the same as those illustrated in FIG. 2 are given the same reference numerals, and descriptions thereof are omitted.

To take a column in which R pixels and Gb pixels are arranged (the first column) as an example, the R pixels are connected to the column output line 136, and the Gb pixels are connected to a column output line 137.

In a column in which Gr pixels and B pixels are arranged (the second column), the Gr pixels are connected to the column output line 136, and the B pixels are connected to the column output line 137. This connection pattern is repeated for the pixels in the third and subsequent columns.

According to this configuration, during still image readout, for example, the column output lines 136 are used when reading out the R pixel signals, and the column output lines 137 are used when reading out the Gb pixel signals.

On the other hand, during live view image readout, the signals from a plurality of R pixels connected to the same column output line 136 can be read out simultaneously and mixed, and likewise, the signals from a plurality of Gb pixels connected to the same column output line 137 can be read out simultaneously and mixed.

FIG. 13 is a diagram illustrating live view image readout scanning according to the present embodiment. First, it is assumed that the readout method used during still image shooting reads out all the pixels, without mixing or thinning the signals, in both the horizontal direction and the vertical direction of the pixel array 130 indicated in FIG. 12.

In the R pixel signal readout indicated in FIG. 12, the column output lines 136 are used, whereas in the Gb pixel signal readout, the column output lines 137 are used. Thus the pixel signals are read out from all rows while switching the column output lines that are used on a row-by-row basis. When column output lines are used simultaneously, either the column output lines 136 are used, or the column output lines 137 are used.

On the other hand, in the readout method used during live view shooting, the signals from every three pixels of the same color are mixed with respect to the horizontal direction, and mixed readout is carried out with two of every three rows with respect to the vertical direction. As in the first and second embodiments, the hatched pixels are pixels that are not read out.

The signals from the horizontal direction pixels X0 to Xi located at the vertical direction positions Y0 and Y2, and the signals from the horizontal direction pixels X0 to Xi located at the vertical direction positions Y3 and Y5, are read out simultaneously in the horizontal period U0 of the horizontal synchronization signal for live view. At this time, the R pixels located at the vertical direction positions Y0 and Y2, which are connected to the same column output line 136, are read out simultaneously and mixed in the column output line 136. Likewise, the signals from the Gb pixels located at the vertical direction positions Y3 and Y5, which are connected to the same column output line 137, are read out simultaneously and mixed in the column output line 137.

Thus unlike the still image readout method, two columns of column output lines, namely the column output line 136 and the column output line 137, are continually used. A readout time 331 for the pixel signals located at the vertical direction positions Y0, Y2, Y3, and Y5 is shorter than the horizontal period U0 of the horizontal synchronization signal.

As such, a time 332 spanning until the start of readout at the next vertical direction position Y6 is a horizontal blanking interval in which the readout circuitry does not operate. This is carried out for all pixels in the vertical direction up to the vertical direction position Yj, whereupon the readout time for live view shooting is complete.

A time 330 obtained by combining the horizontal periods U0 and U1 of the horizontal synchronization signal during live view shooting matches the length of the horizontal period H0 of the horizontal synchronization signal during still image shooting, indicated in FIG. 7. In other words, the time 330 matches the time 301 indicated in FIG. 7, in the same manner as in the first embodiment.

Likewise, a readout time 333 corresponding to one frame in the live view image, indicated in FIG. 13, matches the time 203 indicated in FIG. 5. In other words, the readout time for one frame of a still image matches the readout time for one frame of a live view image.

At this time, in the readout method used during live view shooting, the image sensor 101 does not carry out readout scanning in a horizontal blanking interval 332 within the time 330 corresponding to the horizontal periods U0 and U1 of the horizontal synchronization signal. Accordingly, the power used by a current source, circuitry such as an op-amp, and the like included in the readout circuit 131 can be suppressed, providing an effect of suppressing the amount of power consumed.

Figure 14:
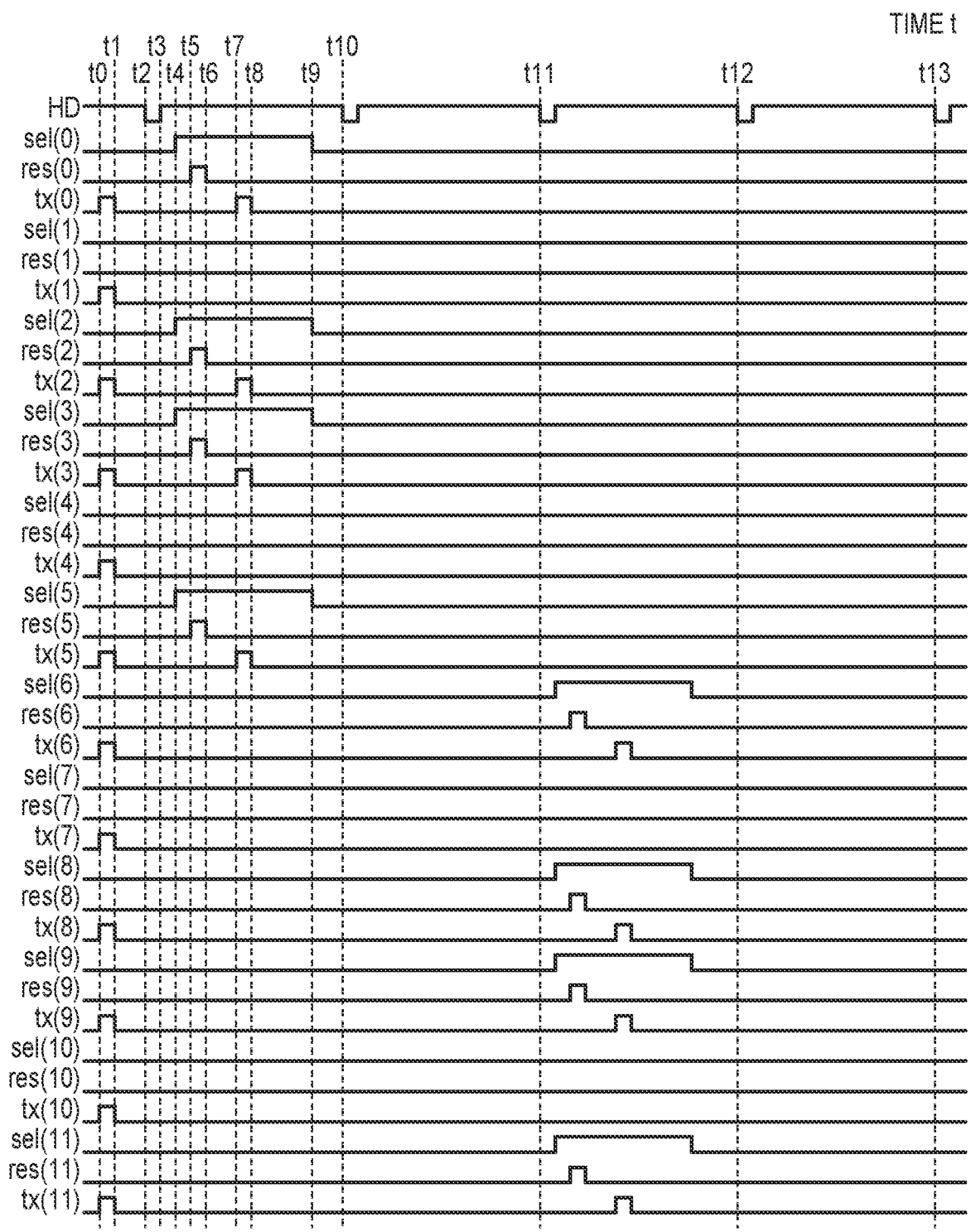
FIG. 14 is a diagram illustrating operation timings of the image sensor according to the third embodiment.

FIG. 14 is a diagram illustrating operation timings of the image sensor 101 during live view shooting according to the present embodiment.

As illustrated in FIG. 14, from time t0 to time t1 (the total pixel reset time), the vertical scanning circuit 133 activates the transfer control signals tx(0) to tx(11), in the same manner as in FIG. 9. As a result, in all of the pixels, the charges accumulated in the photodiodes 140, illustrated in FIG. 3, are transferred to the FD units 142 via the transfer gates 141, and the charges in the photodiodes 140 of all the pixels are reset.

Note that at the same time, the vertical scanning circuit 133 may activate reset control signals res(0) to res(11) and turn the reset switch 144 on.

At time t1, the vertical scanning circuit 133 negates the transfer control signals tx(0) to tx(11). As a result, the resetting of the photodiodes 140 is cancelled, and charge accumulation is started simultaneously, for all of the pixels.

At time t2, the horizontal synchronization signal HD, which indicates the readout time for a single row, is asserted by the CPU 108. Then, at time t4, the vertical transfer (column transfer) is started for the signals of the pixels in the Y0th row, the Y2th row, the Y3th row, and the Y5th row. In other words, at time t4, the vertical scanning circuit 133 activates the selection control signals sel(0), sel(2), sel(3), and sel(5), and turns the pixel selection switch 145 on.

At time t5, the vertical scanning circuit 133 activates the reset control signals res(0), res(2), res(3), and res(5). As a result, the reset switch 144 is turned on, and the charge of a capacitance defined by the FD unit 142 is reset.

At time t6, the vertical scanning circuit 133 negates the reset control signals res(0), res(2), res(3), and res(5). As a result, the reset switch 144 is turned off, the reset is cancelled, and the charge amount in the FD unit 142 at that time is transformed to a voltage by the amplifying MOS transistor 143. A signal having a signal level corresponding to when the reset is cancelled (what is known as a "dark level") is output to the column output lines 136.

Then, at time t7, the vertical scanning circuit 133 activates the transfer control signals tx(0), tx(2), tx(3), and tx(5), and turns the transfer gate 141 on. The signal charges accumulated in the photodiodes 140 of the pixels are transferred to the FD units 142, transformed into voltages by the amplifying MOS transistors 143, and output. At this time, the potential varies from the reset level by an amount that counterbalances the transferred signal charge, and the signal level is set.

At time t8, the vertical scanning circuit 133 negates the transfer control signals tx(0), tx(2), tx(3), and tx(5). Then, at time t9, which is after the vertical transfer of the signals from the pixels 135 is complete, the vertical scanning circuit 133 negates the selection control signals sel(0), sel(2), sel(3), and sel(5). After the pixel signal output has ended, the readout of the pixels in the next row is started at time t10. The time from time t2 to time t10 is equal to the time 300 indicated in FIG. 7.

No pixel signals are read out from time t10 to time t11, and from time t12 to time t13, and thus the selection control signals, the reset control signals, and the transfer control signals are not controlled.

From time t11 to time t12, the selection control signals sel(6), sel(8), sel(9), and sel(11), the reset control signals res(6), res(8), res(9), and res(11), and the transfer control signals tx(6), tx(8), tx(9), and tx(11) are supplied in sequence, at the same timings as during the readout of the pixel signals from the pixels 135 in the Y0th row, the Y2th row, the Y3th row, and the Y5th row, carried out from time t2 to time t10.

The pixel signals from the pixels 135 in the Y6th row, the Y8th row, the Y9th row, and the Y11th row are output as a result. Thus in live view shooting, the pixel signals are output from only some of the pixels in the image sensor 101. The time from time t2 to time t11 is equal to the time 330 indicated in FIG. 13.

According to the above-described operations, even if the column output lines that are used do not match between still image shooting and live view shooting, the pixel signals are read out so that the readout time used during still image shooting is equal to the sum of the readout time used during live view shooting and the horizontal blanking interval. This ensures that the still image readout time and the live view image readout time are equal.

This also eliminates restrictions on the still image readout scanning and reset scanning, and the live view image readout scanning and reset scanning, which in turn makes it possible to display still image readout and live view image readout without any blackouts.

Although the foregoing embodiment describes a method in which the signals from pixels are mixed every three pixels in the horizontal direction and read out, the number of pixels for which the signals are mixed is not limited thereto. In other words, the configuration may be such that the signals are mixed every given desired number of pixels, or that the signals are read out from all of the pixels.

Additionally, although a readout method in which two of every three rows of pixel signals in the vertical direction are mixed is described, the number of pixels for which the signals are mixed is not limited thereto, and the configuration may be such that the signals from a given desired number of pixels are mixed and read out.

Furthermore, although the present embodiment describes a configuration in which the number of column output lines used simultaneously is higher during still image readout scanning than during live view image readout scanning, the configuration may be such that the number of column output lines used simultaneously is higher during live view image readout scanning than during still image readout scanning.

Fourth Embodiment

Figure 15:
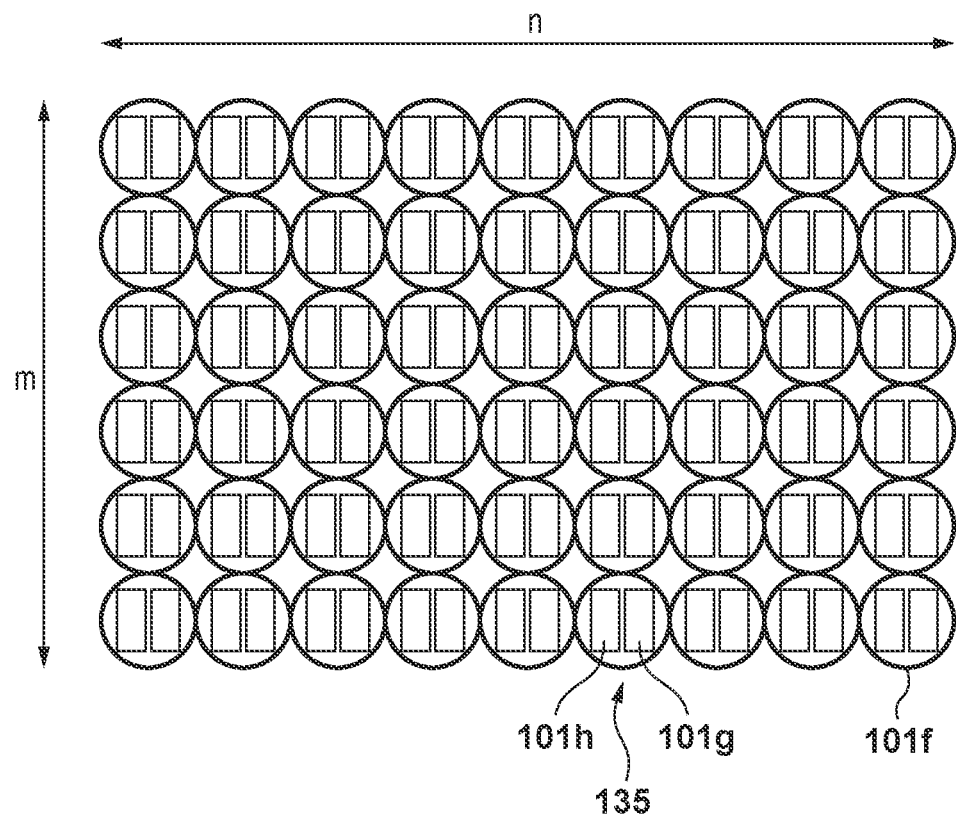
FIG. 15 is a diagram illustrating the configuration of an image sensor according to a fourth embodiment.

FIG. 15 is a diagram illustrating an example of the configuration of a pixel array 130 capable of phase difference detection. The pixel array 130 outputs two-dimensional image data, and thus the plurality of pixels 135 are arranged in a two-dimensional array.

As illustrated in FIG. 15, a plurality of photodiodes (PD) 101g and 101h, indicated by the rectangular boxes, are provided for each of microlenses 101f, indicated by the circles. The PDs 101g and 101h constitute a plurality of photoelectric conversion units. In other words, a single microlens is arranged on the subject side for two PDs constituting each of pixel units.

When the region corresponding to a single microlens 101f is taken as a single pixel, n pixels are arranged in the horizontal direction and m pixels are arranged in the vertical direction. Operation settings can be made in the vertical scanning circuit 133 so that the signal accumulated in the PD 101g and the signal accumulated in the PD 101h are mixed and read out, or so that the signals are read out independently from only one of the PDs, or both of the PDs. Light of different images, having a phase difference as will be described later, is incident on the PD 101g and the PD 101h, respectively.

For the sake of simplicity, the PD 101g will be called an A image pixel, and the PD 101h a B image pixel, hereinafter. Although the present embodiment describes a configuration in which two PDs are provided for a single microlens as an example, the configuration may be such that three or more PDs (e.g., four, nine, or the like) are provided for a single microlens. In other words, the present invention can also be applied in a configuration in which a plurality of PDs are arranged in the vertical direction or the horizontal direction for a single microlens.

Figure 16A:
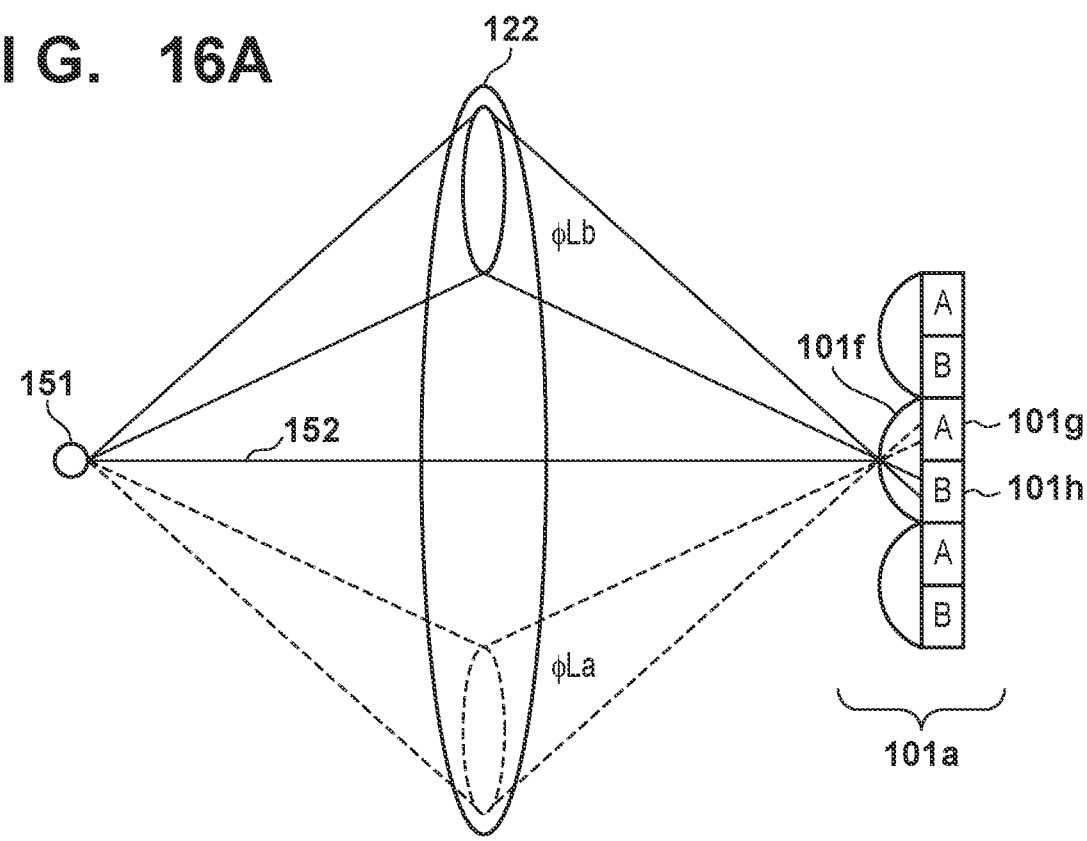
FIGS. 16A and 16B are diagrams illustrating the concept of focus detection according to the fourth embodiment.
Figure 16B:
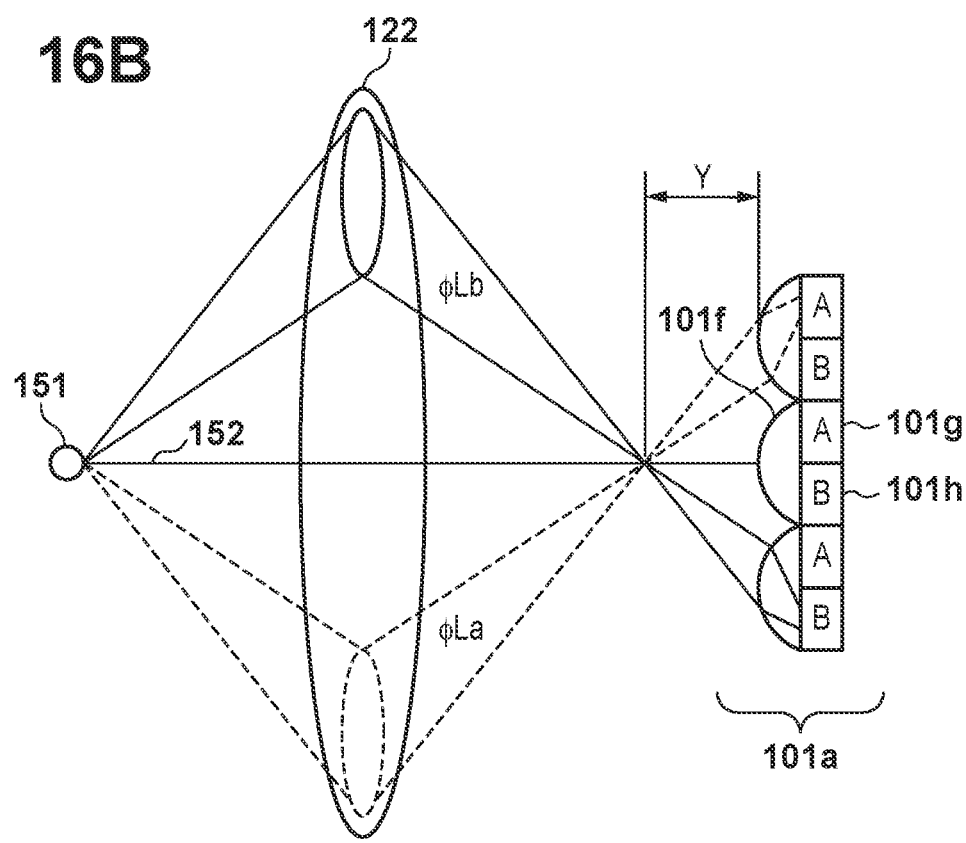

Pixel data output by the A image pixel and the B image pixel in the image sensor 101 having the pixel array configuration illustrated in FIG. 15 will be described next. FIGS. 16A and 16B are schematic diagrams illustrating a relationship between a focus state and a phase difference in the image sensor 101.

In a cross-section 101a of the pixel array illustrated in FIGS. 16A and 16B, an A image pixel 101g and a B image pixel 101h are arranged for each microlens 101f (unit pixel).

The optical imaging system 122 is an optical imaging system that realizes the first lens group 107, the second lens group 106, and the third lens group 105 illustrated in FIG. 1 as a single lens.

Light from a subject 151 passes through the regions of the optical imaging system 122, central to an optical axis 152, and forms an image on the image sensor. Here, the exit pupil coincides with the center of the shooting lens. Light passes through the regions of the optical imaging system 122 from different directions.

In other words, in this configuration, viewing the optical imaging system 122 from the A image pixel 101g and viewing the optical imaging system 122 from the B image pixel 101h are equivalent to the pupil of the optical imaging system 122 being divided symmetrically. To rephrase, a light beam from the optical imaging system 122 is divided into two light beams, or in other words, undergoes pupil division. The divided light beams (a first light beam ΦLa and a second light beam ΦLb) are incident on the A image pixel 101g and the B image pixel 101h, respectively.

A first light beam from a specific point on the subject 151 is the light beam ΦLa, which passes through the divided pupil corresponding to the A image pixel 101g and is incident on the A image pixel 101g. A second light beam from a specific point on the subject 151 is the light beam ΦLb, which passes through the divided pupil corresponding to the B image pixel 101h and is incident on the B image pixel 101h. The pupil-divided two light beams pass and are incident through the optical imaging system 122 from the same point on the subject 151.

Accordingly, when the subject 151 is in focus, the light beams ΦLa and ΦLb pass through the same microlens 101f and reach a single point on the image sensor 101, as indicated in FIG. 16A. The image signals obtained from the A image pixel 101g and the B image pixel 101h therefore have the same phase.

However, when the focus is shifted by a distance Y in the optical axis direction as indicated in FIG. 16B, the positions that the light beams ΦLa and ΦLb reach are shifted from each other by an amount equivalent to the difference in the incident angle at which the light beams ΦLa and ΦLb are incident on the microlens 101f. Accordingly, a phase difference arises between the image signals obtained from the A image pixel 101g and the B image pixel 101h.

The PDs photoelectrically convert the two subject images (an A image and a B image), detected by the A image pixel 101g and the B image pixel 101h, which have a phase difference. After the photoelectric conversion, the signals of the A image and the B image are output to the exterior separately, and are used in AF operations (described later).

Figure 17A:
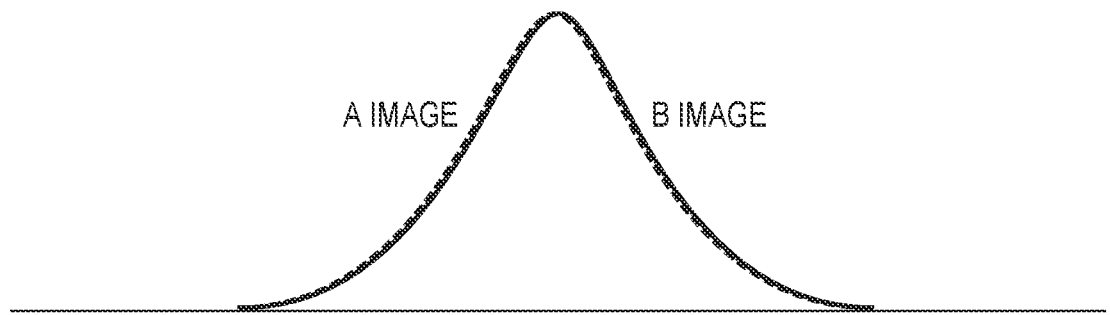
FIGS. 17A and 17B are diagrams illustrating the concept of focus detection according to the fourth embodiment.

FIG. 17A is a diagram illustrating A image data and B image data in a case where the subject is in focus, as illustrated in FIG. 16A. The horizontal axis represents the pixel position, and the vertical axis represents the output level. As illustrated in FIG. 17A, when the subject is in focus, the A image data and the B image data match.

Figure 17B:
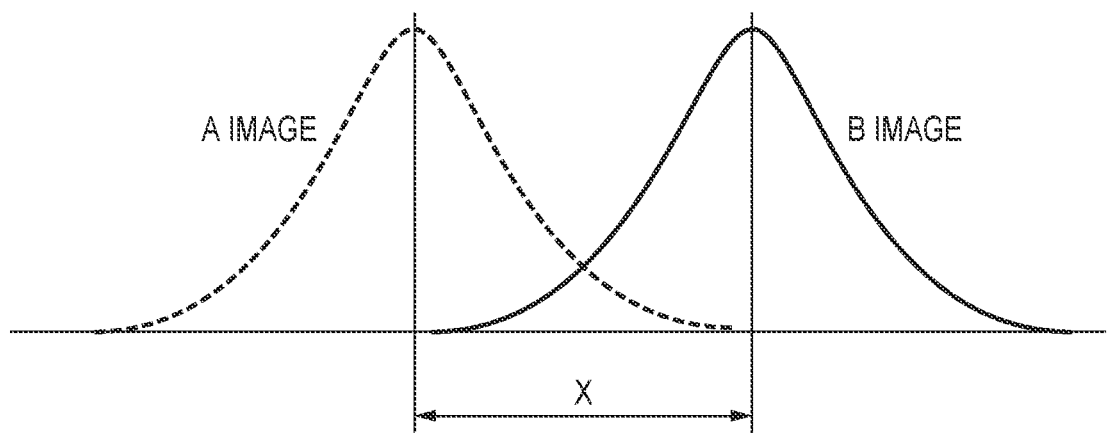

FIG. 17B is a diagram illustrating the A image data and the B image data in a case where the subject is not in focus, as illustrated in FIG. 16B. In this case, the A image data and the B image data have a phase difference, and a shift amount X arises between the pixel positions. By calculating the shift amount X for each moving image frame, the AF computation unit 115 can calculate a focus shift amount, i.e., the value of Y indicated in FIG. 16B. The value of Y calculated by the AF computation unit 115 is sent to the focus driving circuit 116 via the CPU 108 (autofocus operations).

Figure 18:
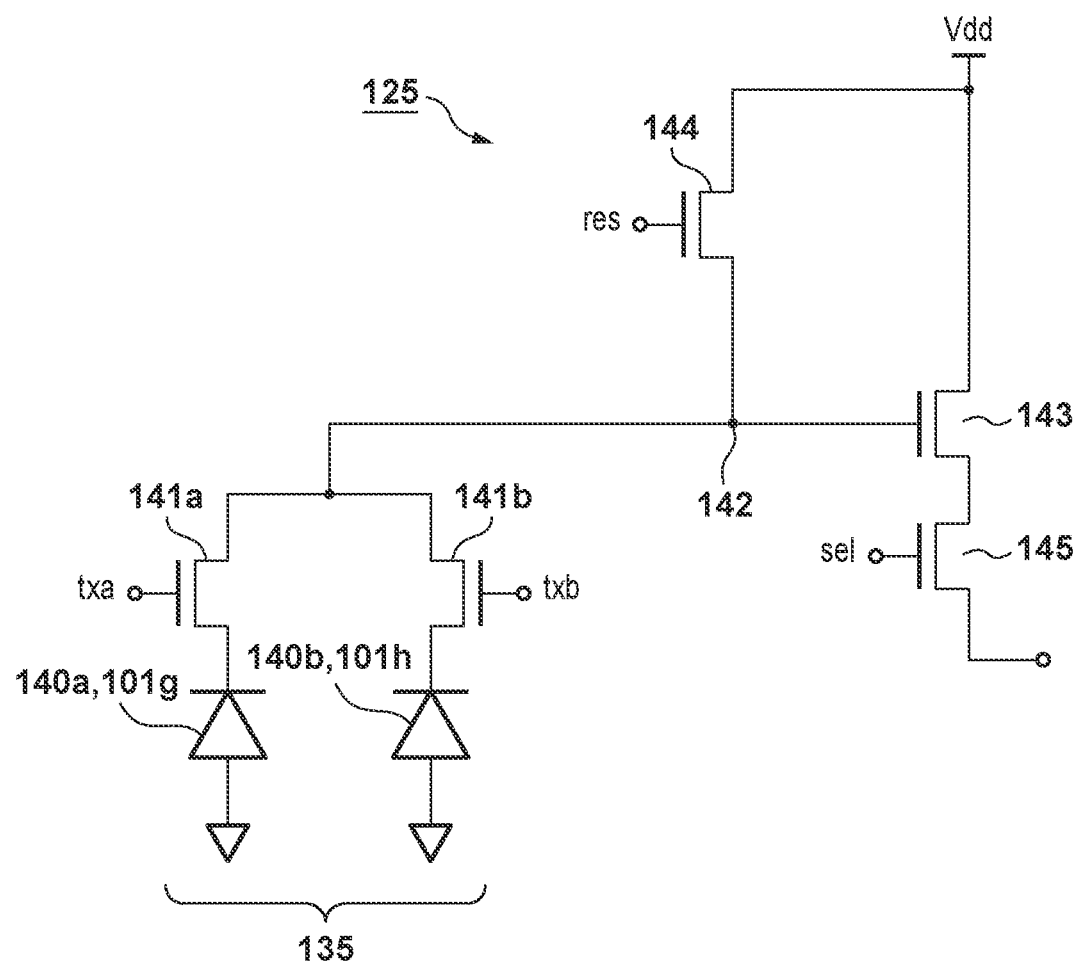
FIG. 18 is a diagram illustrating the configuration of a pixel in the image sensor according to the fourth embodiment.

The configuration of a single one of the pixels 135 will be described here using FIG. 18. Photodiodes (PDs) 140a (101g) and 140b (101h) photoelectrically convert incident light and accumulate charges based on the exposure amount. Transfer gates 141a and 141b turn on (enter a conductive state) in response to transfer control signals txa and txb going to high level, and the charges accumulated in the PDs 140 are transferred to a floating diffusion unit (FD unit) 142.

The FD unit 142 is connected to the gate of the amplifying MOS transistor 143. The amplifying MOS transistor 143 outputs a voltage signal based on the charge amounts transferred from the PDs 140a and 140b to the FD unit 142.

The reset switch 144 is a switch for resetting the charges in the FD unit 142, the PDs 140a and 140b, and the like. The reset switch 144 turns on (enters a conductive state) in response to the reset control signal res going to high level, and the charge in the FD unit 142 is reset.

Additionally, when the charges in the PDs 140a and 140b are reset, the transfer control signals txa and txb and the reset control signal res go to high level simultaneously. Both the transfer gates 141a and 141b and the reset switch 144 turn on, and the charges in the PDs 140a and 140b are reset via the FD unit 142.

The pixel selection switch 145 turns on (enters a conductive state) in response to the selection control signal sel going to high level, and connects the amplifying MOS transistor 143 to the output terminal of the pixel 135. As a result, the pixel signal, which has been transformed to a voltage by the amplifying MOS transistor 143, is output from the output terminal of the pixel 135.

Figure 19:
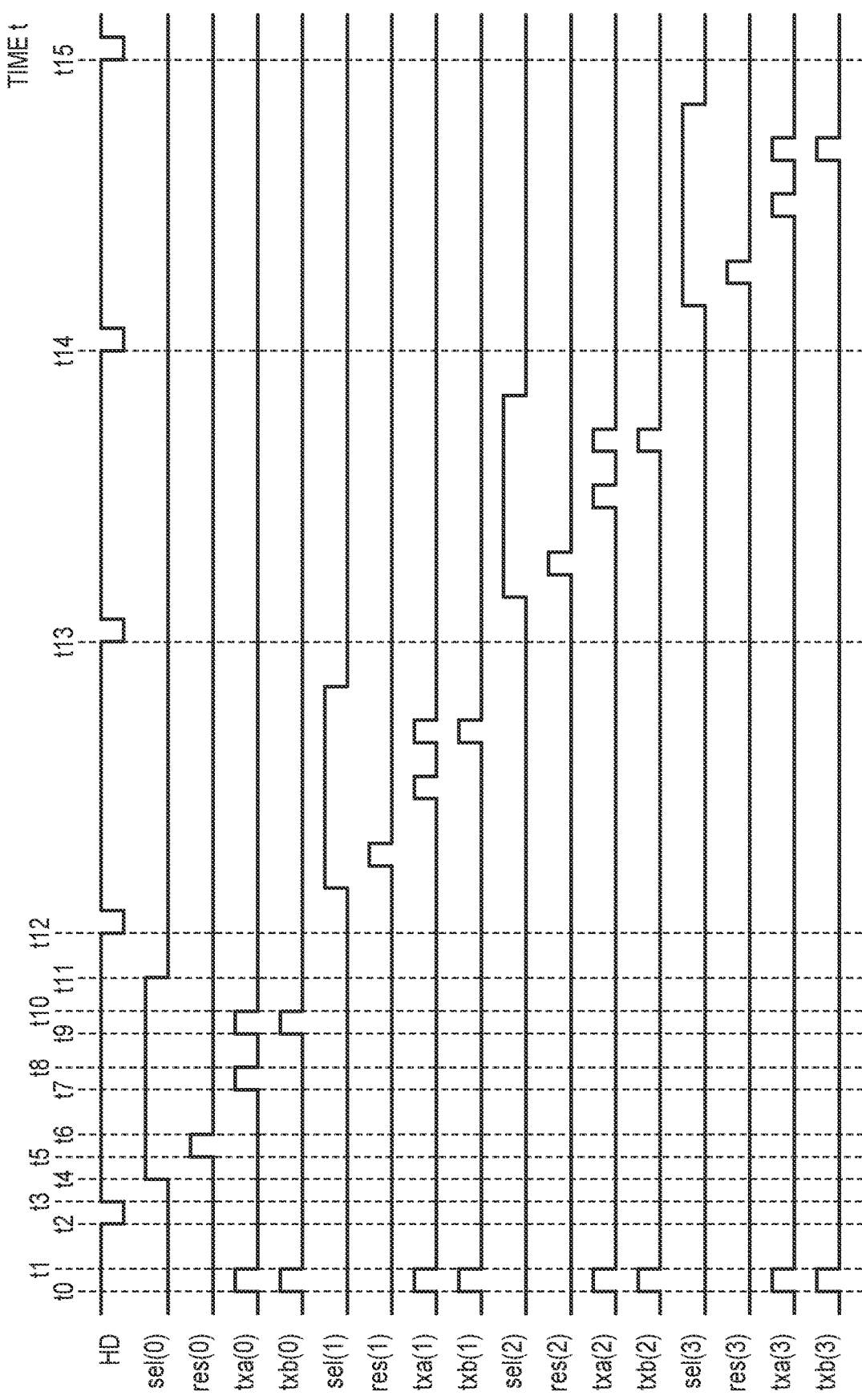
FIG. 19 is a diagram illustrating operation timings of the image sensor according to the fourth embodiment.

FIG. 19 is a diagram illustrating operation timings of the image sensor 101 during still image shooting according to the present embodiment. The image sensor 101 is controlled by the TG 103, under the control of the CPU 108.

As indicated in FIG. 19, from time t0 to time t1 (a total pixel reset time), the vertical scanning circuit 133 illustrated in FIG. 2 activates transfer control signals txa(0) to txa(3) and txb(0) to txb(3). As a result, in all of the pixels, the charges accumulated in the photodiodes 140a (101g) and the photodiodes 140b (101h), illustrated in FIG. 18, are transferred to the FD units 142 via the transfer gates 141a and 141b, and the charges in the photodiodes 140a and 140b of all the pixels are reset.

Note that at the same time, the vertical scanning circuit 133 may activate reset control signals res(0) to res(3) and turn the reset switch 144 on.

At time t1, the vertical scanning circuit 133 negates the transfer control signals txa(0) to txa(3) and txb(0) to txb(3). As a result, the resetting of the photodiodes 140a and 140b is cancelled, and charge accumulation is started simultaneously, for all of the pixels. At a given timing within the time from time t1 to time t2, light incident on the image sensor 101 is blocked by a mechanism outside the image sensor 101 (e.g., the focal plane shutter 104).

Signal charges are accumulated in the photodiodes 140a and 140b of all the pixels in a time spanning from time t1 to when the incident light is blocked (an accumulation time). Although the accumulation of the signal charges is started simultaneously for all of the pixels in the present embodiment, the configuration is not limited thereto. Additionally, the timings at which the photodiodes 140a and 140b are reset may differ from row to row.

At time t2, the horizontal synchronization signal HD, which indicates the readout time for a single row, is asserted by the CPU 108. Then, at time t4, the vertical transfer (column transfer) is started for the signals of the pixels in the Y0th row indicated in FIG. 7. In other words, at time t4, the vertical scanning circuit 133 activates the selection control signal sel(0) and turns the pixel selection switch 145 on.

At time t5, the vertical scanning circuit 133 activates the reset control signal res(0). As a result, the reset switch 144 is turned on, and the charge of a capacitance defined by the FD unit 142 is reset.

At time t6, the vertical scanning circuit 133 negates the reset control signal res(0). As a result, the reset switch 144 is turned off, the reset is cancelled, and the charge amount in the FD unit 142 at that time is transformed to a voltage by the amplifying MOS transistor 143. A signal having a signal level corresponding to when the reset is cancelled (what is known as a "dark level") is output to the column output lines 136.

Then, at time t7, the vertical scanning circuit 133 activates the transfer control signal txa(0) and turns the transfer gate 141a on. The signal charges accumulated in the photodiodes 140a of the pixels are transferred to the FD units 142, transformed into voltages by the amplifying MOS transistors 143, and output. At this time, the potential varies from the reset level by an amount that counterbalances the transferred signal charge, and the signal level of the A image signal is set. At time t8, the vertical scanning circuit 133 negates the transfer control signal txa(0).

Next, at time t9, the vertical scanning circuit 133 activates the transfer control signals txa(0) and txb(0) and turns the transfer gates 141a and 141b on. The signal charges accumulated in the photodiodes 140a and 140b of the pixels are transferred to the FD units 142, transformed into voltages by the amplifying MOS transistors 143, and output. At this time, the potential varies from the reset level by an amount that counterbalances the transferred signal charge, and the signal level of an A+B image signal is set. At time t10, the vertical scanning circuit 133 negates the transfer control signals txa(0) and txb(0).

At time t11, which is after the vertical transfer of the signals from the pixels 135 is complete, the vertical scanning circuit 133 negates the selection control signal sel(0). After the pixel signal output has ended, the readout of the pixels in the next row is started at time t12. The time from time t2 to time t12 is equal to the time 300 indicated in FIG. 7.

From time t12 to time t13, the selection control signal sel(1), the reset control signal res(1), and the transfer control signals txa(1) and txb(1) are supplied in sequence, at the same timings as during the readout of the pixel signals from the pixels 135 in the Y0th row indicated in FIG. 7, carried out from time t2 to time t12. The pixel signals from the pixels 135 in the Y1th row are output as a result.

In the same manner, the pixel signals are read out from the pixels in the Y2th and Y3th rows, from time t13 to time t14, and from time t14 to time t15, respectively. Thus in still image shooting, the pixel signals are output from all the pixels in the image sensor 101 by carrying out the readout operations for all rows in the image sensor 101.

FIG. 20 is a diagram illustrating operation timings of the image sensor 101 during live view shooting according to the present embodiment.

As illustrated in FIG. 20, the selection control signal sel(0), the reset control signal res(0), and the transfer control signals txa(0) and txb(0) are supplied in sequence, at the same timings as when reading out the pixel signals from the pixels 135 in the Y0th row indicated in FIG. 8 from time t2 to time t12 as indicated in FIG. 19, and the pixel signals are output from the pixels 135 in the Y0th row.

However, the pixel signals are not read out from the pixels in the Y1th row and the Y2th row, from time t12 to time t13, and from time t13 to time t14, respectively. As such, the selection control signals sel(1) and sel(2), the reset control signals res(1) and res(2), and the transfer control signals txa(1), txb(1), txa(2), and txb(2) are not controlled. The time from time t2 to time t12 is equal to the time 310 indicated in FIG. 8, and the time from time t12 to time t14 is equal to the time 311 indicated in FIG. 8.

Next, from time t14 to time t15, the selection control signal sel(3), the reset control signal res(3), and the transfer control signals txa(3) and txb(3) are supplied in sequence, at the same timings as during the readout of the pixel signals from the pixels 135 in the Y3th row indicated in FIG. 8, carried out from time t14 to time t15 in the same manner as indicated in FIG. 19, and the pixel signals are output from the pixels 135 in the Y3th row. Thus in live view shooting, the pixel signals are output from only part of the image sensor 101.

As a result of these operations, a readout time 312 corresponding to one frame in the live view image, indicated in FIG. 8, matches the time 301 indicated in FIG. 7.

Likewise, the time 301 indicated in FIG. 7 matches the time 207 indicated in FIG. 5, and the time 312 indicated in FIG. 8 matches the time 203 indicated in FIG. 5. In other words, the readout time for one frame of a still image matches the readout time for one frame of a live view image.

As a result of the above-described operations, signals are read out from a matching number of readout pixels in a single horizontal period of the horizontal synchronization signal, during both still image shooting and live view shooting, and the TG 103 is controlled for each readout mode. Carrying out control in this manner ensures that the still image readout time and the live view image readout time are equal.

This also eliminates restrictions on the still image readout scanning and reset scanning, and the live view image readout scanning and reset scanning, which in turn makes it possible to display still image readout and live view image readout without any blackouts.

Although the present embodiment describes a method in which signals are read out by thinning out one of every three rows of pixels in the vertical direction during live view shooting, the thinning number is not limited thereto, and the configuration may be such that the readout is carried out using any desired thinning number. Furthermore, the configuration may be such that the signals are read out having mixed pixels in the horizontal direction or in the vertical direction, as in the second embodiment and the third embodiment.

Additionally, the present embodiment describes a method in which the A image signal and the A+B image signal are read out during still image shooting and during live view shooting, respectively. However, the configuration may be such that the A image signal and the A+B image signal are read out during only one of still image shooting and live view shooting, and only the A+B image signal is read out during the other of still image shooting and live view shooting.

Furthermore, the present embodiment describes a configuration in which the readout of the A image signal during still image shooting and during live view shooting is carried out for all rows. However, the configuration may be such that the readout time for the A image signal and all rows of the A+B image signal for the still image is caused to match the readout time for the A image signal and all rows of the A+B image signal for the live view image by using only some of the rows from which the A image signal is read out during both or only one of still image shooting and live view shooting.

As described thus far, according to the present embodiment, when using an image sensor capable of reading out an A image signal and an A+B image signal used for AF operations, a still image can be shot at the same time even during live view shooting, without reducing the framerate and while continuing the live view display.

Although preferred embodiments of the present invention have been described above, the present invention is not intended to be limited to these embodiments, and many variations and alterations are possible within the scope thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-085723, filed Apr. 26, 2018, which is hereby incorporated by reference herein in its entirety.

What is claimed is:

1. An image capturing apparatus comprising:
an image sensor including a plurality of pixels; and
at least one processor or circuit configured to function as:
a readout unit that, to carry out a live view display, reads out pixel signals from the image sensor in a first readout mode, and to obtain a still image during the live view display, reads out pixel signals from the image sensor in a second readout mode that is different from the first readout mode; and
a control unit that controls the readout unit,
wherein a number of lines readout in the first readout mode is smaller than a number of lines readout in the second readout mode, and
wherein the control unit controls the readout unit so that time from start of readout operation of one line to start of readout operation of next line of a single frame in the first readout mode is longer than time from start of readout operation of one line to start of readout operation of next line of a single frame in the second readout mode.

2. The image capturing apparatus according to claim 1, wherein in the first readout mode, the pixel signals are thinned or mixed and read out from the image sensor.

3. The image capturing apparatus according to claim 1, wherein in the second readout mode, the pixel signals are read out from the image sensor without being thinned or mixed.

4. The image capturing apparatus according to claim 1, wherein the control unit controls the readout unit so that time from start of the readout operation of a first line to the end of the readout operation of the last line of a single frame in the first readout mode is equal to time from start of the readout operation of a first line to the end of the readout operation of the last line of a single frame in the second readout mode.

5. The image capturing apparatus according to claim 4, wherein the control unit matches a horizontal readout time in the first readout mode with a horizontal readout time in the second readout mode.

6. The image capturing apparatus according to claim 4, wherein the control unit controls to stop the readout operation of signals from the image sensor during time from start of readout operation of one line to start of readout operation of next line in the first readout mode.

7. The image capturing apparatus according to claim 6, wherein in the time in which the readout of the pixel signals is stopped, the control unit reduces power consumption by not driving the image sensor.

8. The image capturing apparatus according to claim 1, wherein a number of column output lines used simultaneously in the first readout mode is different from a number of column output lines used simultaneously in the second readout mode.

9. The image capturing apparatus according to claim 1, wherein the image sensor includes a unit pixel having a first photoelectric conversion unit and a second photoelectric conversion unit; and
in at least one of the first readout mode and the second readout mode, a first signal is read out from the first photoelectric conversion unit or the second photoelectric conversion unit, a second signal obtained by mixing the signals of the first photoelectric conversion unit and the second photoelectric conversion unit is read out from the first photoelectric conversion unit and the second photoelectric conversion unit, and the first signal and the second signal are used in an autofocus operation.

10. The image capturing apparatus according to claim 1, wherein a state in which the pixel signals are read out in the first readout mode is switched to the second readout mode in response to a user operation.

11. A method for controlling an image capturing apparatus, the image capturing apparatus including an image sensor having a plurality of pixels, and the method comprising:
reading out pixel signals, to carry out a live view display, from the image sensor in a first readout mode, and reading out pixel signals, to obtain a still image during the live view display, from the image sensor in a second readout mode that is different from the first readout mode; and
controlling the readout,
wherein a number of lines readout in the first readout mode is smaller than a number of lines readout in the second readout mode, and
wherein, in the controlling, the readout is controlled so that time from start of readout operation of one line to start of readout operation of next line of a single frame in the first readout mode is longer than time from start of readout operation of one line to start of readout operation of next line of a single frame in the second readout mode.

* * * * *